United States Patent
Nakamura

(10) Patent No.: US 9,030,710 B2
(45) Date of Patent: May 12, 2015

(54) IMAGE PROCESSING APPARATUS, IMAGE PROCESSING SYSTEM, AND IMAGE PROCESSING METHOD

(71) Applicant: Satoshi Nakamura, Tokyo (JP)

(72) Inventor: Satoshi Nakamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 63 days.

(21) Appl. No.: 13/681,513

(22) Filed: Nov. 20, 2012

(65) Prior Publication Data

US 2013/0135635 A1 May 30, 2013

(30) Foreign Application Priority Data

Nov. 24, 2011 (JP) ................................. 2011-256350

(51) Int. Cl.
*G06F 15/00* (2006.01)
*G06K 1/00* (2006.01)
*H04N 1/60* (2006.01)

(52) U.S. Cl.
CPC .............. *H04N 1/603* (2013.01); *H04N 1/6052* (2013.01)

(58) Field of Classification Search
None
See application file for complete search history.

(56) References Cited

U.S. PATENT DOCUMENTS

| 7,965,427 | B2* | 6/2011 | Suzuki et al. ............... 358/518 |
| 7,978,366 | B2 | 7/2011 | Ming |
| 2008/0068626 | A1* | 3/2008 | Bala et al. ................... 358/1.9 |
| 2008/0304087 | A1* | 12/2008 | Shin et al. ................... 358/1.6 |
| 2010/0328490 | A1* | 12/2010 | Kurane et al. ............ 348/229.1 |
| 2011/0310411 | A1* | 12/2011 | Hirano ....................... 358/1.9 |
| 2012/0057209 | A1 | 3/2012 | Nakamura |
| 2012/0189200 | A1 | 7/2012 | Nakamura |
| 2012/0189209 | A1 | 7/2012 | Nakamura |

FOREIGN PATENT DOCUMENTS

JP 2009-177790 8/2009

* cited by examiner

*Primary Examiner* — Vincent Rudolph
*Assistant Examiner* — Michael Burleson
(74) *Attorney, Agent, or Firm* — Harness, Dickey & Pierce, P.L.C.

(57) ABSTRACT

An image processing apparatus includes a first image output device and a second image output device outputting first and second output data from the original image data, a color component mapping device generating color component mapping data containing correspondences between a first or second output image data obtained by capturing the output data with an input device and the original image data, a color tone conversion parameter fixing device generating color tone conversion parameters from pixels in the first output image data and in the original image data, the pixel in the original image data when output as the second output image data having a pixel value equal to the value of the pixel in the first output image data, and a color tone conversion device using the conversion parameters.

12 Claims, 26 Drawing Sheets

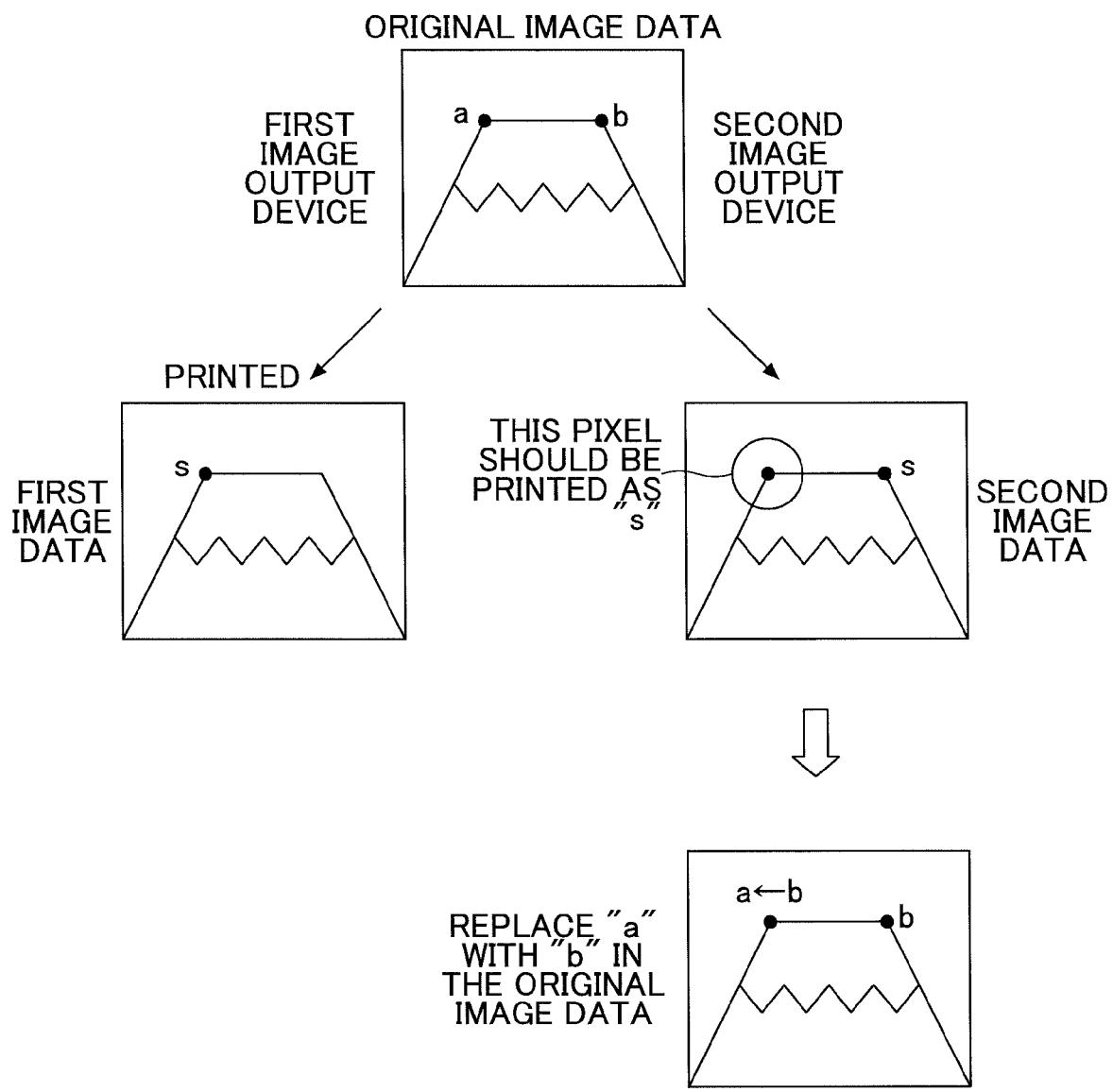

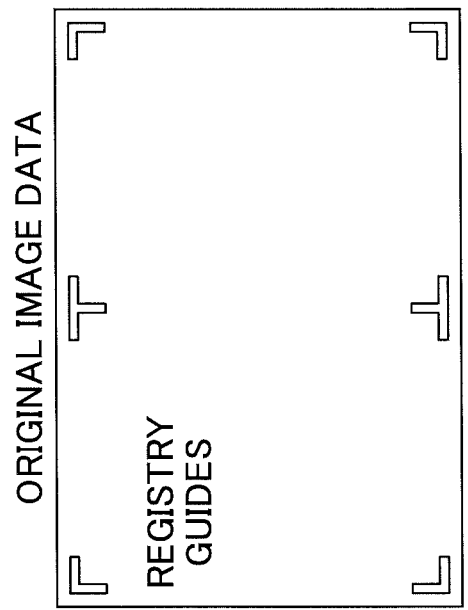
FIG.12A
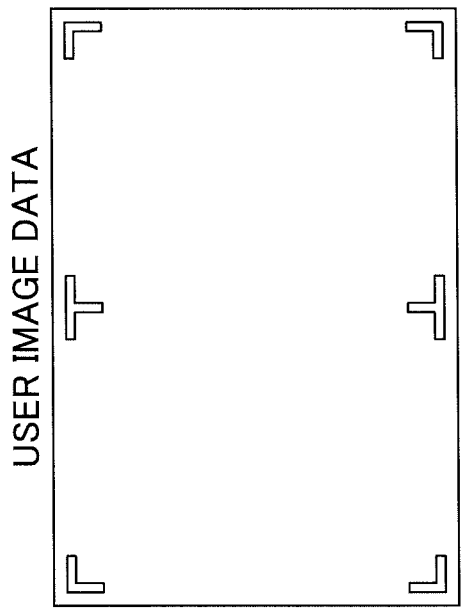
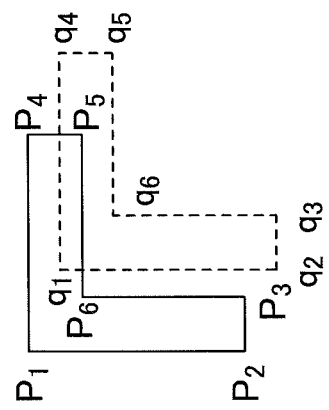
FIG.12B

FIG.13

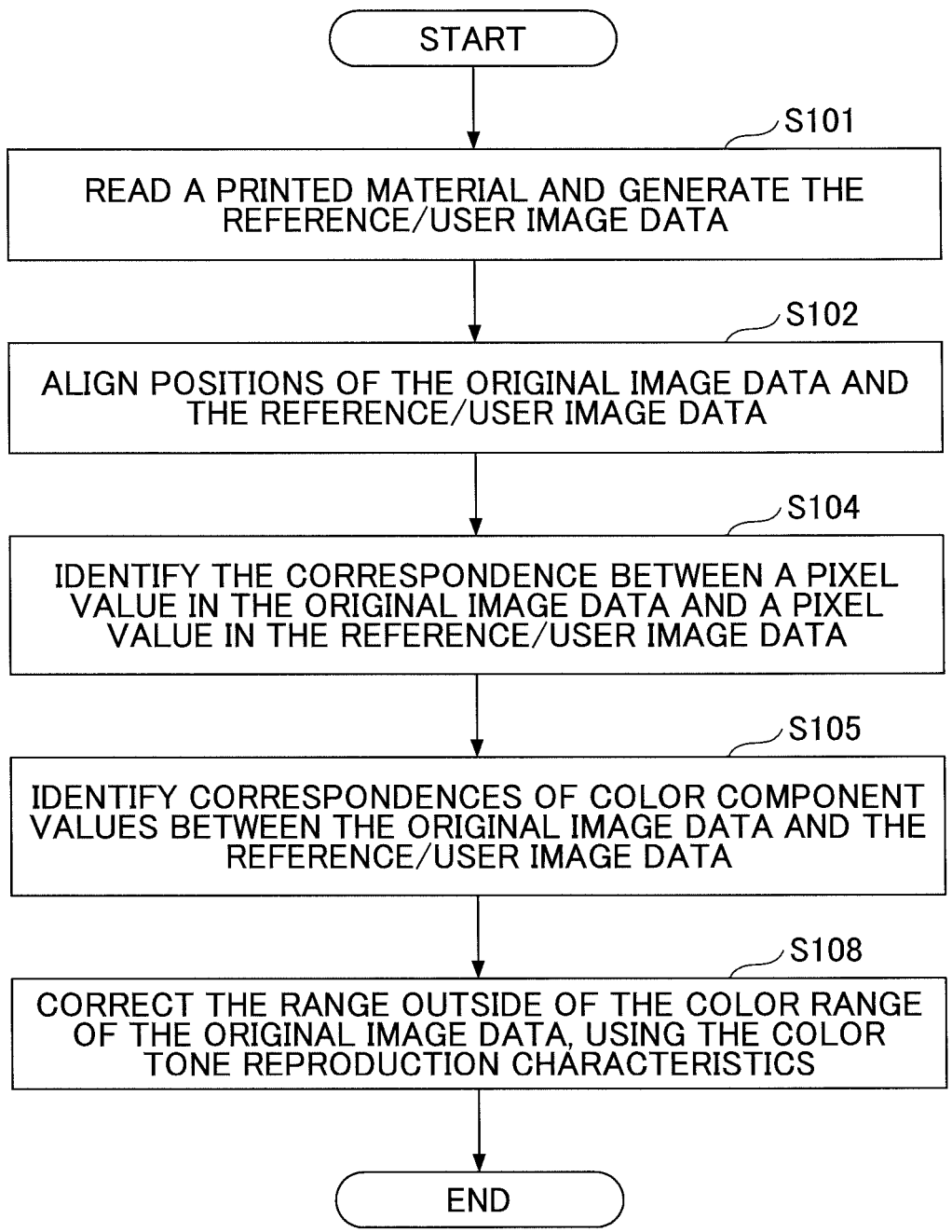

IMAGE PROCESSING APPARATUS, IMAGE PROCESSING SYSTEM, AND IMAGE PROCESSING METHOD

BACKGROUND OF THE INVENTION

1. Field of the Invention

The disclosures herein generally relate to an image processing apparatus having a first image output device outputting first output data from original image data, and a second image output device outputting second output data from the original image data in such a way that the color tone of the first output data is reproduced in the second output data.

2. Description of the Related Art

Image output devices such as printers, displays, and the like, need to output image data according to pixel values of original image data. For this purpose, the color profile of an image output device may be updated, according to a comparison between pixel values in the original image data and pixel values in a printed material measured by a colorimeter. In a case of updating the color profile of an image output device, a method using a color chart is widely practiced. In this method, an image output device outputs a color chart whose original pixel values are known beforehand. Then, the printed color chart is measured by a colorimeter such as scanner. The known pixel values and the measured pixel values are compared. Finally, the color profile of the image output device is updated, according to the comparison result. Japanese Laid-open Patent Publication No. 2009-177790, for example, discloses details.

There are two patterns of operations for updating the color profile of an image output device. Details are as follows, taking a printer as an example.

a) $1^{st}$ Pattern: Adjusting Color Tone to a Reference Color Chart

In this method, a predetermined reference color chart is printed by the image output device. Each color patch in the color chart is measured by a colorimeter. The color profile of the image output device such as a printer is updated so that the difference between the measured value and the expected value will fall into a predetermined range.

b) $2^{nd}$ Pattern: Adjusting Color Tone to a Reference Image Output Device

As an example of this method, a proofer may be used. A proofer is a calibration device, or a printer that can generate equivalent output as the calibration device. The color tone of the output image from a proofer is matched with the color tone of the output image from the image output device. In this case, the proofer and the image output device print color charts respectively. Each color patch in the two printed color charts is measured by a colorimeter. The color profile of the proofer is updated so that differences between two measured values of patches fall into a predetermined range.

The previously used color profile update methods, however, have a problem that these methods cannot be executed when a printed reference color chart is not available. As described above, in case of matching the color tone of the output image from an image output device with the color tone of the output image from another image output device, both devices need to output the same color chart. In reality, a reference image output device may not be able to output a color chart, or another image output device whose color profile needs to be updated may not be able to obtain a printed material of the color chart from the reference image output device.

As an example of these cases, a commercial printing company may receive an order from a customer. The customer may request the commercial printing company to match the color tone of ordered printed materials with the output image obtained by the customer's printer. If the customer adopts proper color management, it is possible for the commercial printing company to satisfy the customer's request under the circumstances described above. Unfortunately, the customer may not be an expert of color management. Proper color management includes periodic calibration of image output devices, or the adoption of standard color management of image data such as International Color Consortium profile.

If the reference color chart is not available and the customer does not adopt proper color management, the commercial printing company needs to match colors by hand. This work may be done through a trial and error process, which is time consuming and requires a lot of skill, experiences, and intuition of the operator of this work. Moreover, as the result of color matching is confirmed by using printed materials, this work consumes a lot of paper and the commercial printing company may suffer a loss due to the waste paper.

SUMMARY OF THE INVENTION

It is a general object of at least one embodiment of the present invention to provide an image processing apparatus that substantially obviates one or more problems caused by the limitations and disadvantages of the related art. Specifically, it may be desirable to provide an image processing apparatus that can calibrate differences between the color tones of two printed materials without using a color chart.

According to an embodiment, an image processing apparatus has a first image output device outputting first output data from original image data, and, a second image output device outputting second output data from the original image data. The image processing apparatus includes a color component mapping device, a color tone conversion parameter fixing device, and a color tone conversion device.

The color component mapping device is configured to generate first color component mapping data containing correspondences between pixel values in first output image data obtained by capturing the first output data with an input device and pixel values in the original image data, and second color component mapping data containing correspondences between pixel values in second output image data obtained by capturing the second output data with the input device and pixel values in the original image data.

The color tone conversion parameter fixing device is configured to utilize the first color component mapping data and the second color component mapping data to generate color tone conversion parameters from pairs of a pixel value in the first output image data and a pixel value in the original image data. The pixel value in the original image data when output as the second output image data has a pixel value equal to the pixel value in the first output image data.

The color tone conversion device converts pixel values in the original image data in response to the color tone conversion parameters.

The color tone conversion parameter fixing device generates the color tone conversion parameters from the pairs of pixel values reproducible by the first and the second image output device from the original image data.

According to at least one embodiment, an image processing apparatus that can calibrate differences between the color tones of two printed materials without using a color chart is provided.

BRIEF DESCRIPTION OF THE DRAWINGS

Other objects and further features of embodiments will be apparent from the following detailed description when read in conjunction with the accompanying drawings, in which:

FIG. 1 is a schematic view illustrating the relationship between two pixel values, "a" and "b";

FIG. 12A and FIG. 12B are schematic views illustrating an estimation of geometric transformation parameters;

FIG. 13 is a schematic view of mask data;

FIG. 19 is a flowchart illustrating a 1E procedure in which an image input unit captures a reference printed material and a user printed material, then, a color tone reproduction characteristics estimation unit generates color tone reproduction characteristics data, according to a second embodiment;

DESCRIPTION OF THE PREFERRED EMBODIMENTS

Figure 2A:
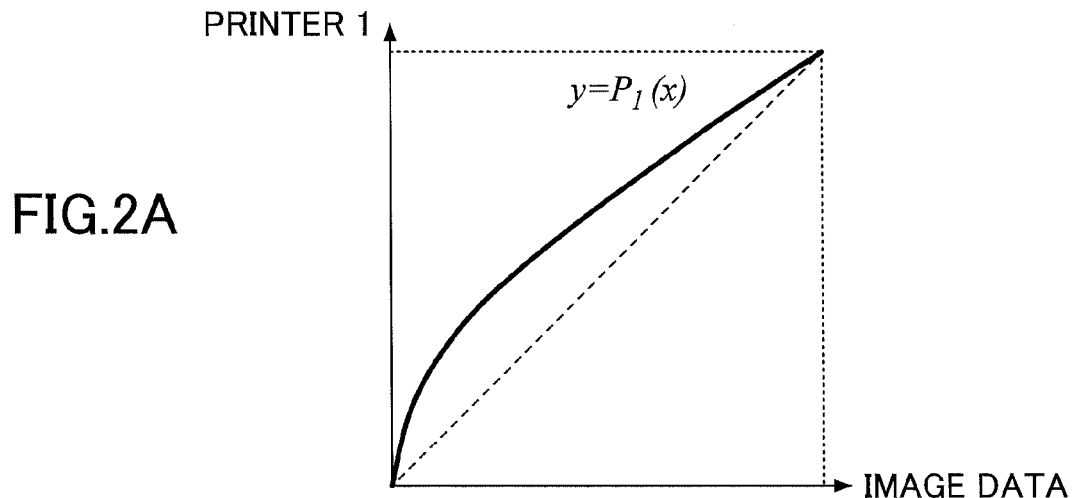
FIG. 2A, FIG. 2B, and FIG. 2C are schematic views illustrating color tone conversion characteristics.

In the following, embodiments of the present invention will be described with reference to the accompanying drawings.

First Embodiment

[Outline of Color Tone Conversion]

FIG. 1 is a schematic view illustrating the relationship between two pixel values, "a" and "b". A printed value of "a" by a first image output device and a printed value of "b" by a second image output device will be considered. The first image output device and the second image output device print the same image data, which will be referred as original image data hereafter.

The color tone reproduction characteristics of the first image output device will be denoted as $P_1(x)$. The color tone reproduction characteristics of the second image output device will be denoted as $P_2(x)$. The color tone reproduction characteristics of an image input device will be denoted as $S(x)$, where "x" represents a color or a pixel value. Since a pixel value can be regarded as a color in a specific color space, they may be used interchangeably, although pixel value and color may not be equivalent when considering various color spaces. Using the above denotations, the first color tone reproduction characteristics can be denoted as $S(P_1(x))$, and the second color tone reproduction characteristics can be denoted as $S(P_2(x))$.

$P_1(x)$ is a printed color when the first image output device prints a pixel value x, and $S(P_1(x))$ is a shade when an image input device captures the color $P_1(x)$. $P_2(x)$ is a printed color when the second image output device prints the pixel value x, and $S(P_2(x))$ is a shade when the image input device captures the color $P_2(x)$.

When the first and second image output device print the same pixel value x, $S(P_1(x))=S(P_2(x))$ may not be satisfied because the color tone reproduction characteristics of the two devices may be different from each other. On the other hand, even if a pixel value printed by the first image output device is not equal to another pixel value printed by the second image output device, it is possible that there exists a pair of colors, a and b, denoted (a, b) hereafter, such that $S(P_1(a))=S(P_2(b))$. It is noted that $S(P_1(a))$ and $S(P_2(b))$ do not need to be exactly the same.

The image processing apparatus of the present embodiment seeks one or more pairs of (a, b) such that $S(P_1(a))=S(P_2(b))$. Once such a pair is obtained, the first and second image output device can print materials in the same color tone because the second image output device can converts the pixel value "a" into the pixel value "b" before printing. The conversion results in a printed color $S(P_2(b))$ which is equal to $S(P_1(a))$.

The first image output device prints a first output material in which the printed pixel value "a" has a shade "s" when captured by a scanner. The second image output device prints a second output material in which the printed pixel value "b" has a shade "S" when captured by the scanner. When matching the color tone reproduction characteristics of the second image output device with the characteristics of the first image output device, the second image output device needs to print the pixel value "a" in such a way that the printed color of "a"

is regarded as "s" by the scanner. Therefore, the second image output device converts the pixel value "a" into "b". With this color conversion, it is possible for the second image output device to print materials in the same color tone as the first image output device does.

Figure 2B:
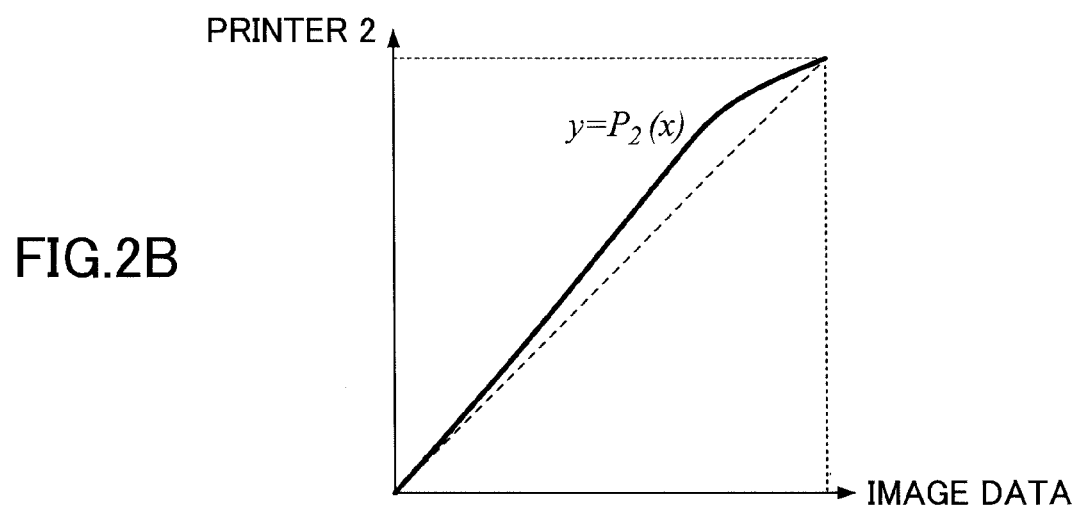
Figure 2C:
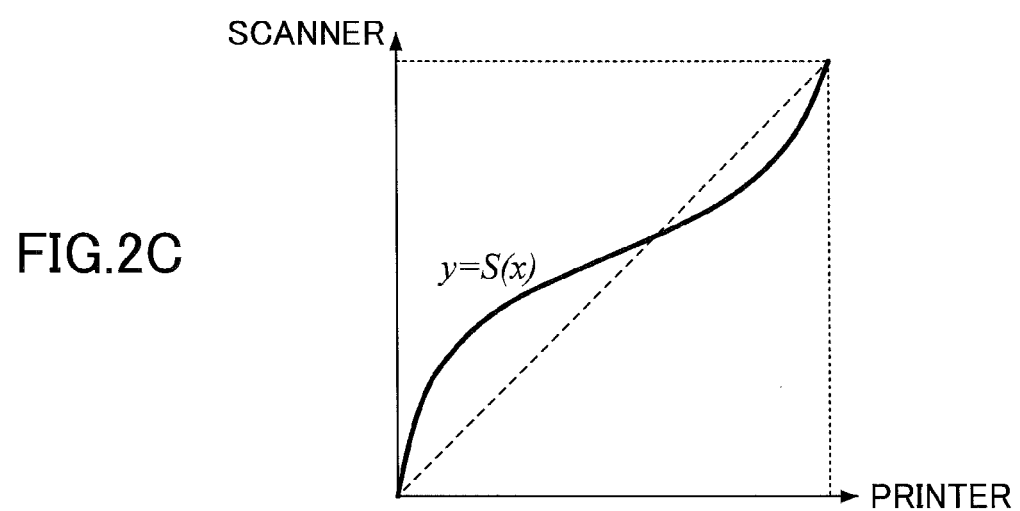

Color tone reproduction characteristics will be further explained with FIGS. 2A-C in which a printer is taken as an image output device and a scanner is taken as an image input device. FIG. 2A and FIG. 2B are schematic views illustrating color tone reproduction characteristics. The color tone reproduction characteristics of the first image output device can be rephrased how the first image output device maps a color in the original image data into a shade. Therefore, the color tone reproduction characteristics can be shown graphically as a solid curve in FIG. 2A in which the horizontal axis represents colors in the image data and the vertical axis represents shades of the color in the printed 1E material of the image data.

The dashed line shows the provisional color tone reproduction characteristics in which a color in the original image data is the same as the shade in the printed material. Compared the dashed line with the solid curve, dark portions in the image data are assigned more shades than bright portions.

Similarly, the solid curve in FIG. 2B shows the color tone reproduction characteristics of the second image output device. Again in FIG. 2B, dark portions in the image data are assigned more shades than bright portions. Compared to FIG. 2A, bright portions in the image data are assigned more shades than dark portions.

On the other hand, the color tone reproduction characteristics of the image input device can be rephrased how the image input device maps a shade in the image data at an input printed material data into a color. Therefore, with the horizontal axis representing shades of the color in the printed material and the vertical axis representing of colors in the image data, the color tone reproduction characteristics of the image input device can be shown as the solid curve in FIG. 2C. In FIG. 2C, dark portions and bright portions in the image data are assigned more pixel values and pixel values in intermediate portions are compressed.

If the printer profile or the scanner profile is provided, the color tone reproduction characteristics described above can be obtained. Even if the printer profile is not provided, the printer profile can be obtained by having the printer print a color chart, which in turn is measured by a colorimeter. The scanner profile can be obtained by scanning a color chart, and compare the results with the measured values.

By obtaining the printer profile in this way, it is possible to estimate the color tone reproduction characteristics even if at least one of the printer profiles is not provided, or the color chart cannot be printed.

[Effects on Color Reproduction Range]

The above method may have adverse effects if the original image data includes colors out of the color reproduction range of the image output device. The colors out of the range may be changed into unexpected colors, which reduce the precision of color reproduction. For example, if the original image data is represented in an RGB color space, it cannot have the same color reproduction range when printed with an image output device which uses a CMYK (cyan-magenta-yellow-black) color space. Although this may not be likely to happen for business purposes, problems may occur even if the original image data is represented in CMYK. If the number of shades in the original image data is large, colors out of the color reproduction range of an image output device may be printed in a single color.

In the present embodiment, image output devices take the color reproduction range of the devices into consideration to match colors. More specifically, the following three patterns are considered.

a) Color tone conversion parameters are determined with neglecting pixel data in the original image data, whose pixel value or color is out of the color reproduction range of the image output device.

b) Color tone conversion parameters that are out of the color reproduction range of the image output device are converted by function or other means.

b-1) Parameters out of the color reproduction range are converted by function, interpolation, or other means during the calculation phase of the color tone conversion parameters (in the process of estimating the characteristics of an image output device).

b-2) Parameters out of the color reproduction range are converted by interpolation after the calculation process of the color tone conversion parameters.

[Summary of the Printer Profile Generation in the Present Embodiment]

Figure 3:
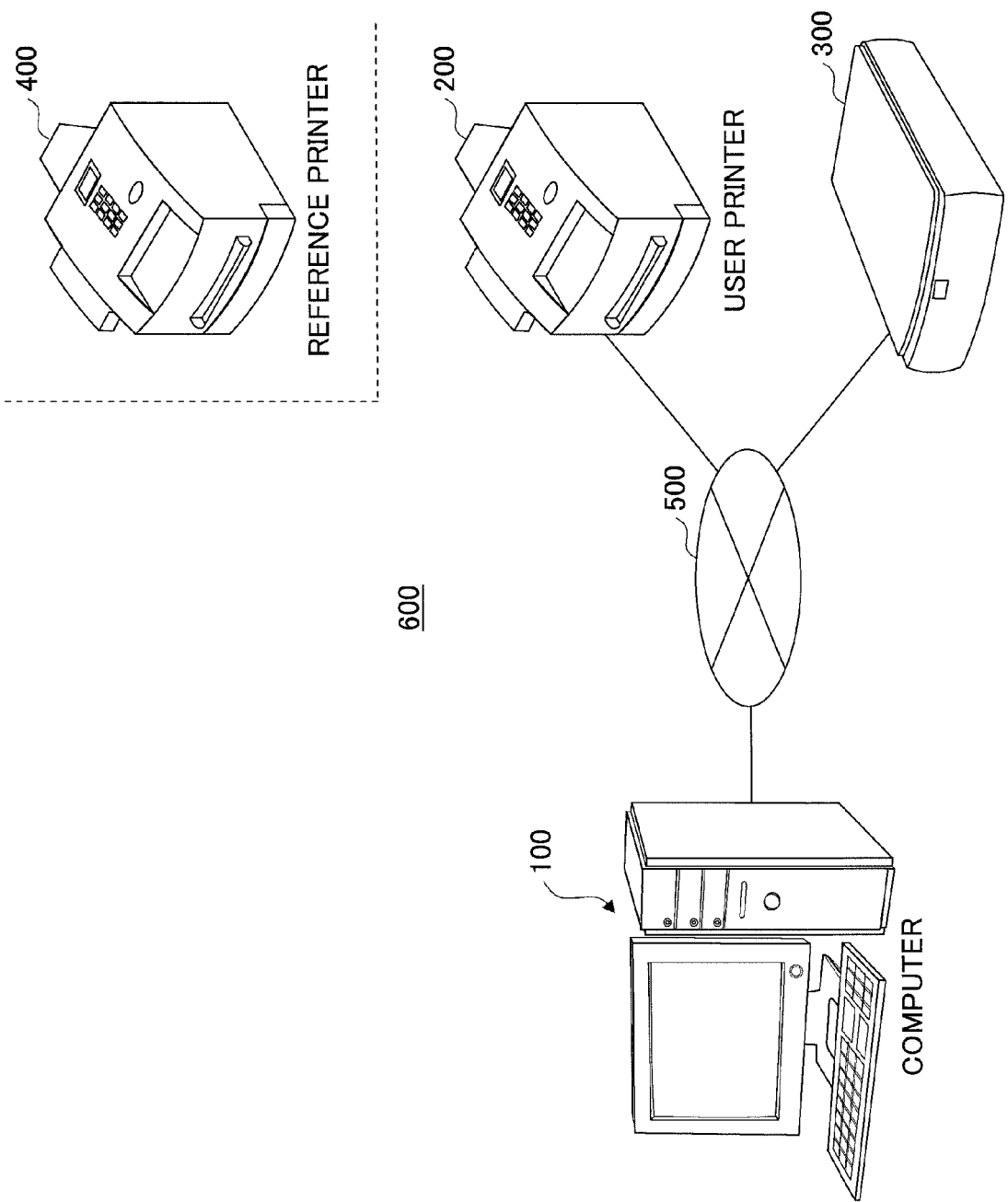
FIG. 3 is a configuration diagram of a color tone conversion parameter generating system.

FIG. 3 is a configuration diagram of a color tone conversion parameter generating system 600. The summary of generation of the color tone conversion parameter will be explained in detail. To match color tones between the first and the second image output devices, the color conversion is applied to the original image data. The flow of this process will be explained. Devices and image data used in the following explanation are listed and defined as follows:

The first image output device is a printer, called a "reference printer".

The second image output device is another printer, called a "user printer".

The image input device is a scanner.

Reference printer corresponds to the first image output device whose color tone serves as a target to be achieved.

User printer corresponds to the second image output device whose color tone will be converted to match the color tone of the reference printer 400.

Scanner corresponds to the image input device.

Original image data is image data used by the printers to produce printed materials.

Reference printed material is a printout of the original image data printed by the reference printer 400, which is the target of color tone matching.

Reference image data is image data obtained by capturing the reference printed material using the image input device.

User printed material is a printout of the original image data printed by the user printer 200, whose color tone needs to be matched to the reference image data.

User image data is the image data obtained by capturing the user printed material using the image input device.

In the present embodiment, the reference printed material and the user printed material are used and a color tone conversion is applied to the original image data, which will be given to the user printer 200. By doing so, the user printed material with the same color tone as the reference printed material will be obtained.

The device that executes the color tone conversion may be either one of the second image output device, the scanner 300, or the computer 100, which may be separated from other devices. In the present embodiment, the computer 100 is supposed to execute generation of color conversion parameters.

The steps to generate color conversion parameters are as follows:

(1) Estimation of the first color tone reproduction characteristics

First, a combined reference color tone reproduction characteristics, $S(P_1(x))$, will be estimated by the following steps. The combined characteristics of the reference printer 400 and the scanner 300 is estimated because it is difficult to separately extract the color tone reproduction characteristics of the reference printer.

(1-1) The reference printed material is captured by the scanner 300 and the reference image data is obtained.

(1-2) The position, tilt and size of the original image data and the reference image data are adjusted.

(1-3) Pixels at corresponding positions in the original image data and the reference image data are identified and the corresponding colors are stored.

(1-4) A color in the reference image data that corresponds to a pixel value in the original image data is identified.

(2) Estimation of the second color tone reproduction characteristics

Next, a combined user color tone reproduction characteristics, $S(P_2(x))$, will be estimated by the following steps. $S(P_2(x))$ represents the combined characteristics of the user printer 200 and the scanner 300.

(2-1) The original image data is printed by the user printer 200 and the user printed material is obtained.

(2-2) The user printed material is captured by the scanner 300 and the user image data is obtained.

(2-3) The position, tilt and size of the original image data and the user image data are adjusted.

(2-4) pixels at corresponding positions in the original image data and the user image data are identified and the corresponding colors are stored.

(2-5) A color in the user image data that corresponds to a pixel value in the original image data is identified.

(3) Estimation of color tone conversion parameters Color tone conversion parameters are obtained from the reference color tone reproduction characteristics and the user color tone reproduction characteristics.

(3-1) From the reference color tone reproduction characteristics, a color in reference image data, $s=S(P_1(a))$, which corresponds to a color "a" in the original image data, is obtained.

(3-2) From the user color tone reproduction characteristics, a color "b" in original image data that corresponds to a color $s=S(P_2(b))$ in the user image data is obtained.

(3-3) The correspondence between the color "a" and the color "b" is identified, i.e., a pair of colors (a, b) that satisfies $S(P_1(a))=s=S(P_2(b))$ is obtained.

(3-4) Color tone conversion parameters are derived from pairs of colors such as (a, b) in the original image data.

(4) Color tone conversion of the original image data Finally, the color tone conversion of the original image data is done with the color tone conversion parameters, and the original image data is updated. Following the steps (1) to (4), the user data that is obtained from the color-tone-converted original image data printed by the user printer 200 has substantially the same color tone as that of the reference image data. The steps (1) to (4) may be iterated until the color tone difference between the reference image data and the user image data falls into a predetermined range if only one pass of the steps (1) to (4) does not result in substantially the same color tone. In case of iteration, the converted original image data after the color tone conversion is used when estimating the color tone reproduction characteristics of the user printer 200.

Figure 4:
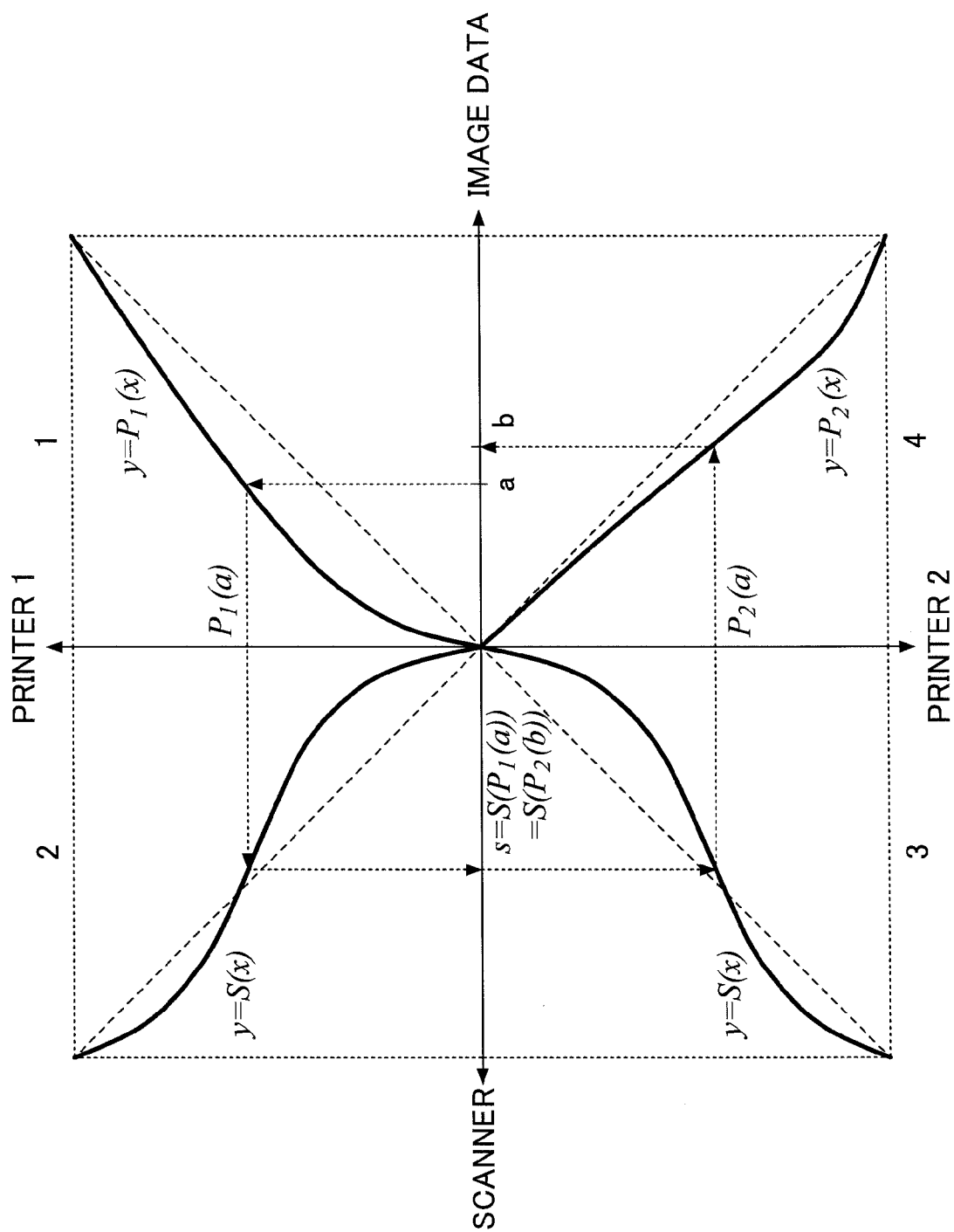
FIG. 4 is a conceptual diagram illustrating generation of color tone conversion parameters.

FIG. 4 is a conceptual diagram illustrating the steps (1) to (3). FIG. 4 consists of the following graphs located in its four quadrants, respectively:

FIG. 2A is located in the first quadrant.

A horizontally-reversed image of FIG. 2C is located in the second quadrant.

A 180-degree-rotated image of FIG. 2C is located in the third quadrant.

A vertically-reversed image of FIG. 2B is located in the fourth quadrant.

The above steps (1) to (3) correspond to FIG. 4 as follows:

Step (1), which estimates the reference color tone reproduction characteristics, corresponds to drawing the graph in the first and second quadrants.

Step (2), which estimates the user color tone reproduction characteristics, corresponds to drawing the graph in the third and fourth quadrants.

Step (3), which estimates the color tone conversion parameters, corresponds to identifying pairs of colors (a, b) that satisfies $S(P_1(a))=S(P_2(b))$, as indicated with arrows in FIG. 4.

It is noted that although in the above steps (1) and (2), the combined characteristics of the printer and the scanner 300 are estimated, these characteristics are separately displayed in FIG. 4 for the sake of convenience.

The conceptual explanation above assumes idealistic circumstances where all the ranges of color reproduction in the original image data are covered by the printer or the scanner. In reality, however, the majority of printers may not cover the color reproduction range of original image data. Suppose a printer covers the range of colors supported in JapanColor 2001 Coated and original image data covers ranges of colors in sRGB. Since sRGB has wider ranges of colors than Japan-Color 2001 Coated, especially in blue or yellow-green, a gamut mapping may be needed to print such original image data. A gamut mapping is a technique in color management that substitutes colors within a specific range of colors, called a gamut. With the gamut mapping, shades of a color may be lost, or replaced with other reproducible colors.

Figure 5A:
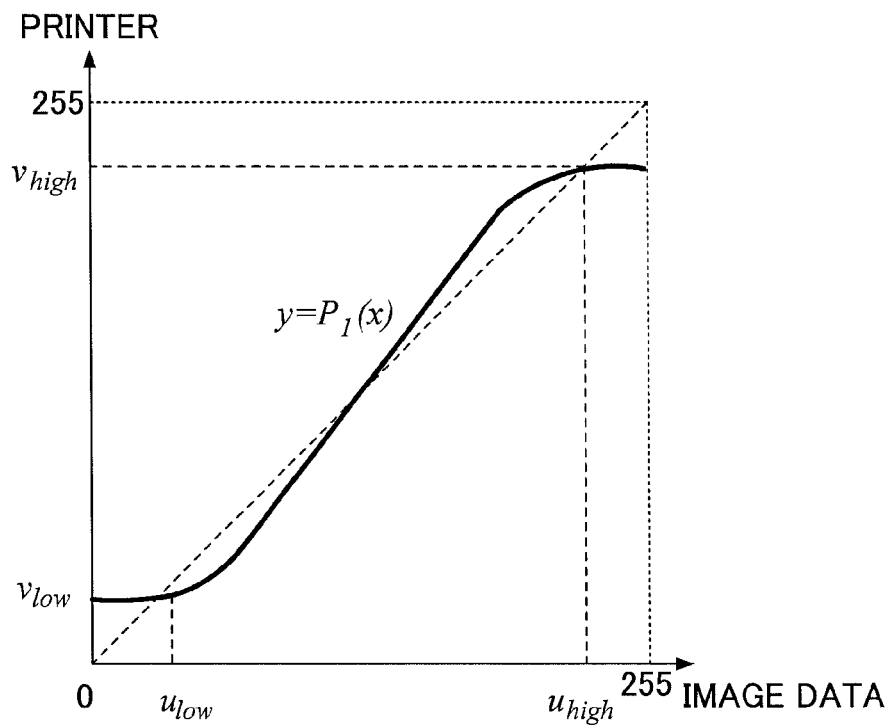
FIG. 5A and FIG. 5B are schematic views illustrating inconvenience of gamut mapping.
Figure 5B:
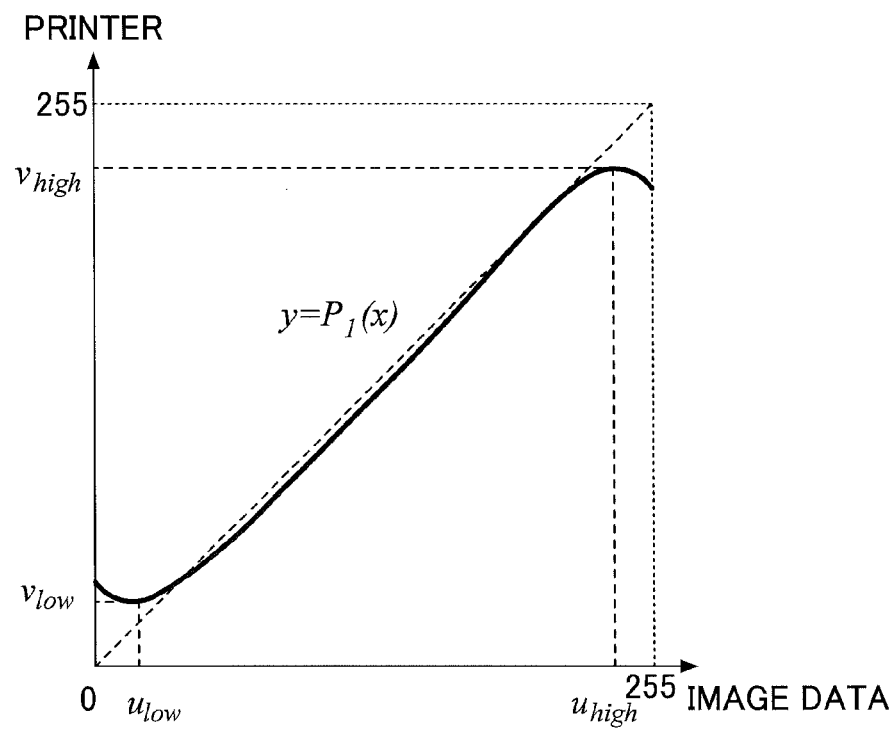

FIG. 5A and FIG. 5B are schematic views illustrating inconvenience of gamut mapping.

a) Case where Shades of Color are Lost

The x-axis in FIG. 5A represents the range of color, or pixel value, in original image data, and the y-axis represents the color reproduction range of a printer, respectively. The color reproduction range of the printer is between $v_{low}$ and $v_{high}$. Assuming pixel values $u_{low}$ and $u_{high}$ in the original image data correspond to the $v_{low}$ and $v_{high}$, respectively, colors below $u_{low}$ and above $u_{high}$ in the original image data fall out of the color reproduction range of the printer. In this case, the colors below $u_{low}$ and above $u_{high}$ in the original image data have a near zero slope in the color tone reproduction characteristics curve, which means the portion of the curve is almost parallel to the x-axis. Shades of colors below $u_{low}$ and above $u_{high}$ in the original image data are lost in this kind of color tone reproduction characteristics curve.

b) Case where Colors are Replaced with Other Colors Reproducible by Printer

FIG. 5B also represents another case where the color reproduction range of the printer is narrower the color reproduction range of the original image data. In FIG. 5B, the slope of the color tone reproduction characteristics curve has portions with a negative value slope, not a zero slope. These portions are observed because when the hue, saturation, and/or brightness of a color deviate from their true values in a target colors space, such deviation appears as non-linear fluctuations.

This kind of color tone reproduction characteristics may raise problems illustrated below with FIG. 6, which is a conceptual diagram illustrating generation of color tone conversion parameters when a user printer has a restricted color reproduction range.

1) The first problem is that there may be ranges in the color tone reproduction characteristics curve in which a reference printer and a user printer do not correspond with each other. In FIG. 6, the printer 1, for example a reference printer, covers the whole color reproduction range while the printer 2, for example a user printer, only covers a part of the color reproduction range. A color "a" in the original image data becomes the color $P_1(a)$ in a printed material printed by the printer 1, then becomes $S(P_1(a))$ after captured by the scanner. When captured by the scanner, however, there is no such color of $S(P_1(a))$ in another printed material printed by the printer 2. This means there are ranges in which colors cannot be mapped properly. The proper mapping is required for the generation of color tone conversion parameters. Similar problems always arise when the color reproduction range of the printer 1 and the printer 2 are different from each other.

2) The second problem is that there may be cases where the color tone reproduction characteristics mapping between a reference printer and a user printer may involve one-to-many, many-to-one, or many-to-many correspondences.

Figure 6:
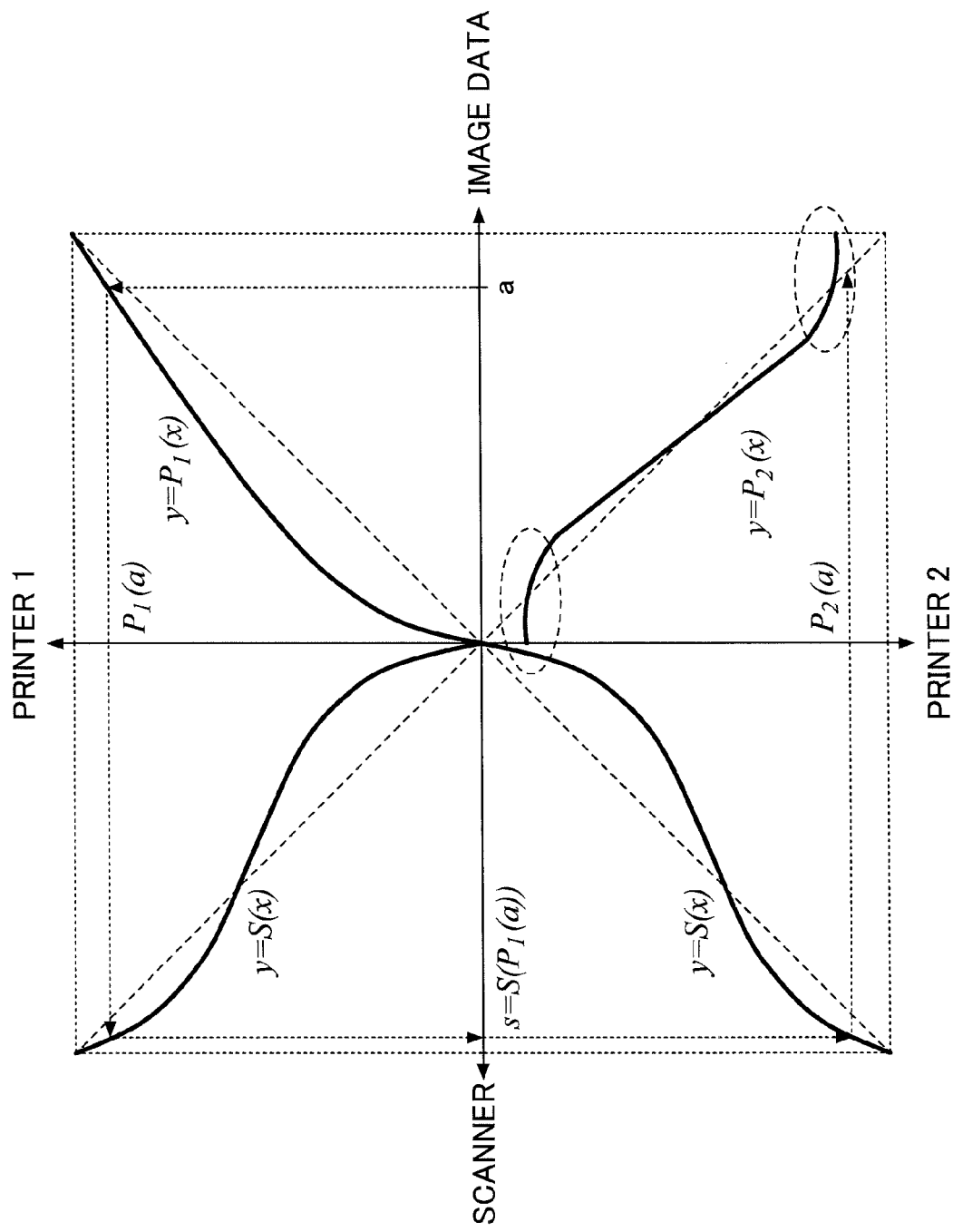
FIG. 6 is a conceptual diagram illustrating generation of color tone conversion parameters when a user printer has a restricted color reproduction range.

Although (a, b) in the original image data can be mapped, there can be seen one-to-many or many-to-one mapping between "a" and "b" in portions on the color tone reproduction characteristics curve, $y=P_2(x)$ surrounded by dashed ovals in FIG. 6, i.e., (a, b) do not have a one-to-one relationship. In this case, how to select a value from multiple choices of "a" or "b" and how to synthesize a pair of values become a problem.

The color tone conversion parameter generating system 600 in FIG. 3 includes the computer 100, the user printer 200, and the scanner 300 connected via the network 500. Instead of the scanner 300, a spectrophotometer or a camera may be used. The reference printer 400 that is not assumed to be in the user environment of the color tone conversion parameter generating system 600, may be or may not be connected to the network 500. A user of the color tone conversion parameter generating system 600 already has, or can have a reference printed material.

A display may be used as a first image output device. A projector may be used as a second image output device. A digital camera may be used as an image input unit.

The network may include a local area network (LAN) in a company, a wide area network (WAN), an IP-Virtual Private Network (IP-VPN), the internet, or a combination of these. The network may also include telephone lines regardless of wired or wireless connection provided that the computer 100, the user printer and the scanner can communicate through the network.

In case of adjusting past colors and present colors on a single printer, the reference printer 400 and the user printer do not necessarily need to be separate devices. The reference printer 400 and the user printer may have functions such as scanning, FAX, or copying other than printing. Similarly, the scanner 300 may have functions such as printing, FAX, or copying other than scanning. A device with multiple functions is often called MFP (Multifunction Peripheral).

The computer 100 estimates the color tone conversion parameters from three pieces of image data: the original image data used by the reference printer 400 when printing the reference printed material, the reference image data obtained by the scanner 300 when capturing the reference printed material, and the user image data obtained by the scanner 300 when capturing the user printed material printed by the printer 200 from the original image data. The original image data may be stored in the user printer 200 beforehand, or obtained from the reference printer 400. The computer 100, the user printer 200, and the scanner 300 may be integrated into a single MFP.

Figure 7:
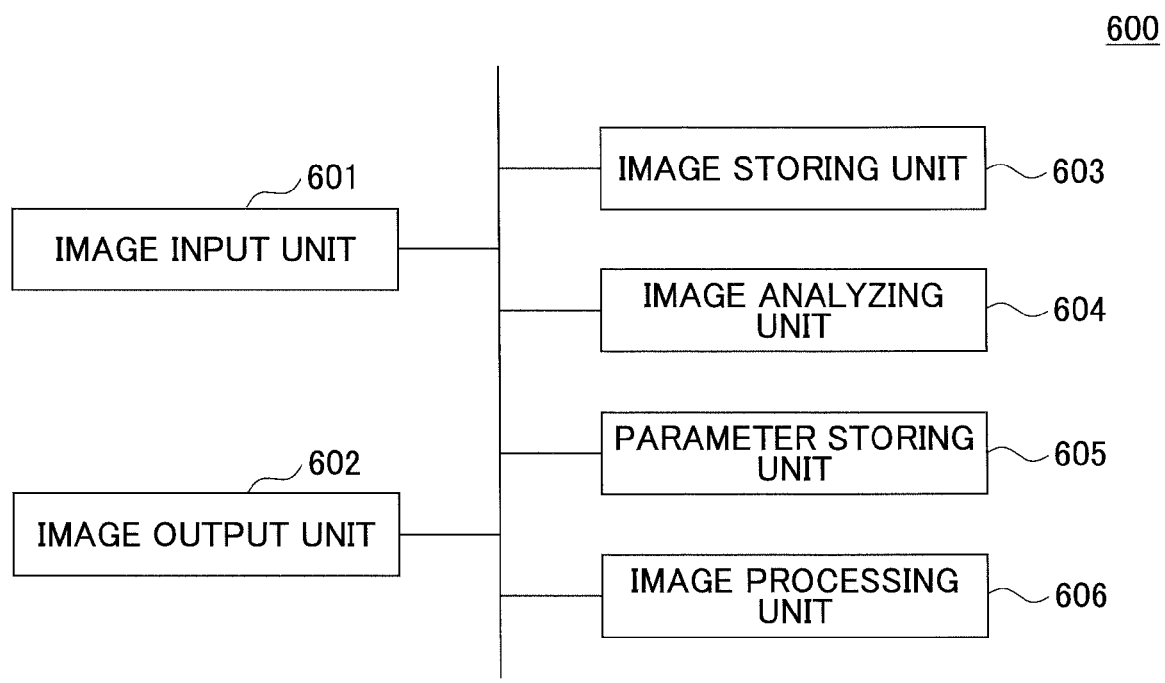
FIG. 7 is a hardware configuration diagram of a color tone conversion parameter generating system.

FIG. 7 is a hardware configuration diagram of the color tone conversion parameter generating system 600. The color tone conversion parameter generating system 600 includes an image input unit 601, an image output unit 602, an image storing unit 603, an image analyzing unit 604, a parameter storing unit 605, and an image processing unit 606.

The image input unit 601 captures the image output by an image output device, and corresponds to the scanner 300 in FIG. 3. The image storing unit 603 stores the image data obtained by the image input unit 601, and corresponds to the computer 100 in FIG. 3. The image analyzing unit 604 analyzes the reference image data, the user image data and the original image data to generate color tone conversion parameters, and corresponds to the computer 100 in FIG. 3. The parameter storing unit 605 stores the color tone conversion parameters obtained by analyzing the image data, and corresponds to the computer 100 in FIG. 3. The image processing unit 606 executes color tone conversion based on the obtained color tone conversion parameters, and corresponds to the user printer 200 in FIG. 3. The image output unit 602 outputs the color-tone-converted image, and corresponds to the user printer 200 in FIG. 3.

Figure 8:
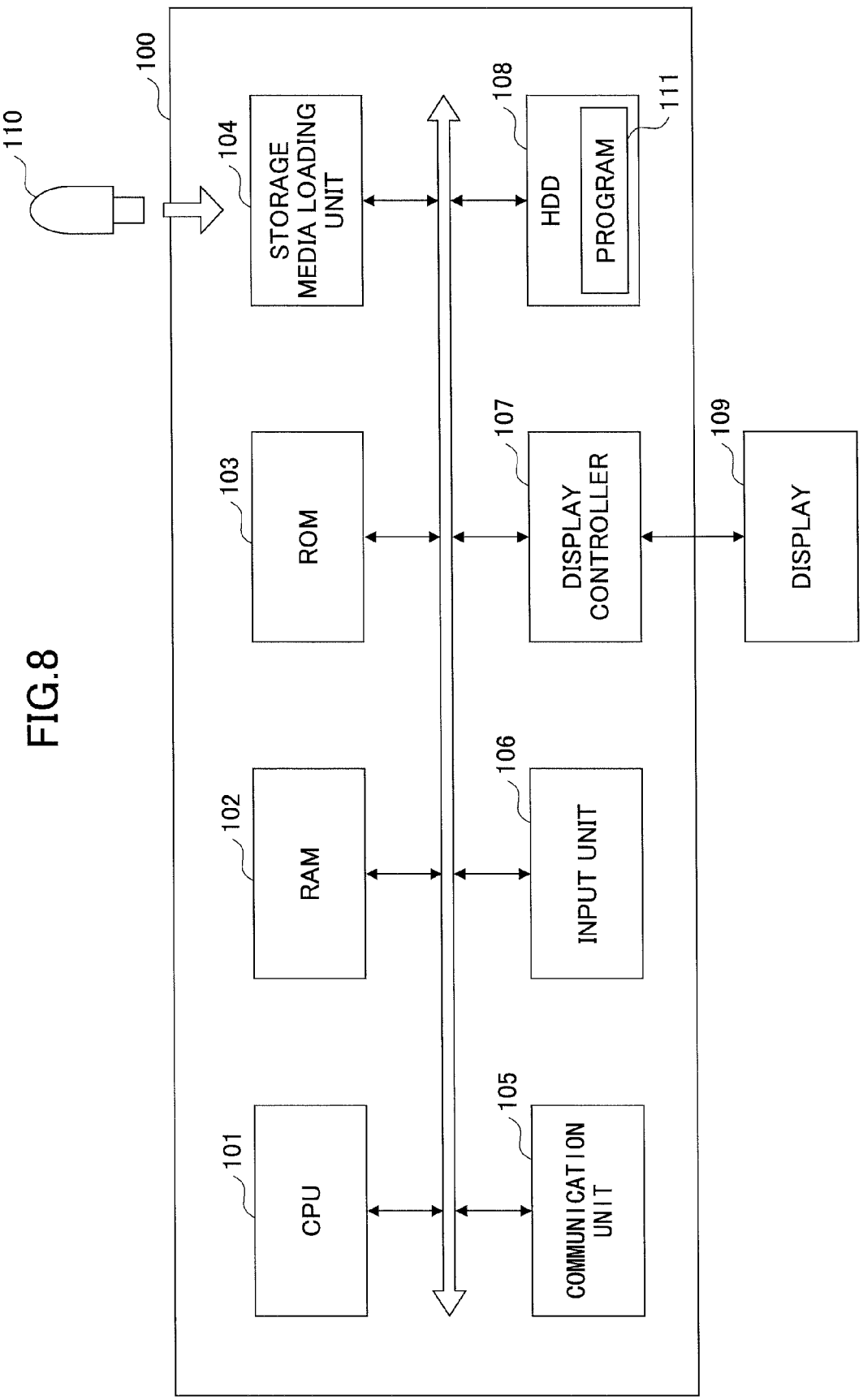
FIG. 8 is a hardware configuration diagram of a computer.

FIG. 8 is a hardware configuration diagram of the computer 100. The computer 100 has a CPU 101, a RAM 102, a ROM 103, a storage media loading unit 104, a communication unit 105, an input unit 106, a display controller 107, and a hard disk drive (HDD) 108. These units are connected to a bus. The CPU 101 reads operating system (OS) programs or other programs from the HDD 108 and executes these programs to offer various functions. The CPU 101 also performs a process of generating color tone conversion parameters.

The RAM 102 is a working memory, or main memory to temporarily store data required for CPU to execute programs. The ROM 103 stores a basic input output system (BIOS), i.e., programs for starting up the OS, and also static data.

The storage media loading unit 104 can load and unload storage media 110, reads data recorded on the storage media 110 and stores the data in the HDD 108. The storage media loading unit 104 may write data stored in the HDD 108 into the storage media 110. The storage media 110 may be an USB memory device, SD card, or the like. The program 111 is distributed by the storage media 110 or downloaded from servers not illustrated here.

The input unit 106 includes a keyboard, a mouse, a trackball, and the like. The input unit 106 receives, as input, various user commands to be supplied to the computer 100.

The HDD 108 may be replaced with non-volatile storage devices such as solid state drives (SSDs). The HDD 108 stores the OS, programs, and various data including image data. The HDD 108 also stores a database 49 which includes color reproduction range information as described later. The color reproduction range information may be downloaded from servers not illustrated here.

The communication unit 105 is a network interface card (NIC) such as an Ethernet card.

The display controller 107 generates and displays screen images on the display 109 by interpreting graphic commands stored in a graphic memory. The graphic commands are stored by the CPU 101 upon executing the program 111.

Figure 9:
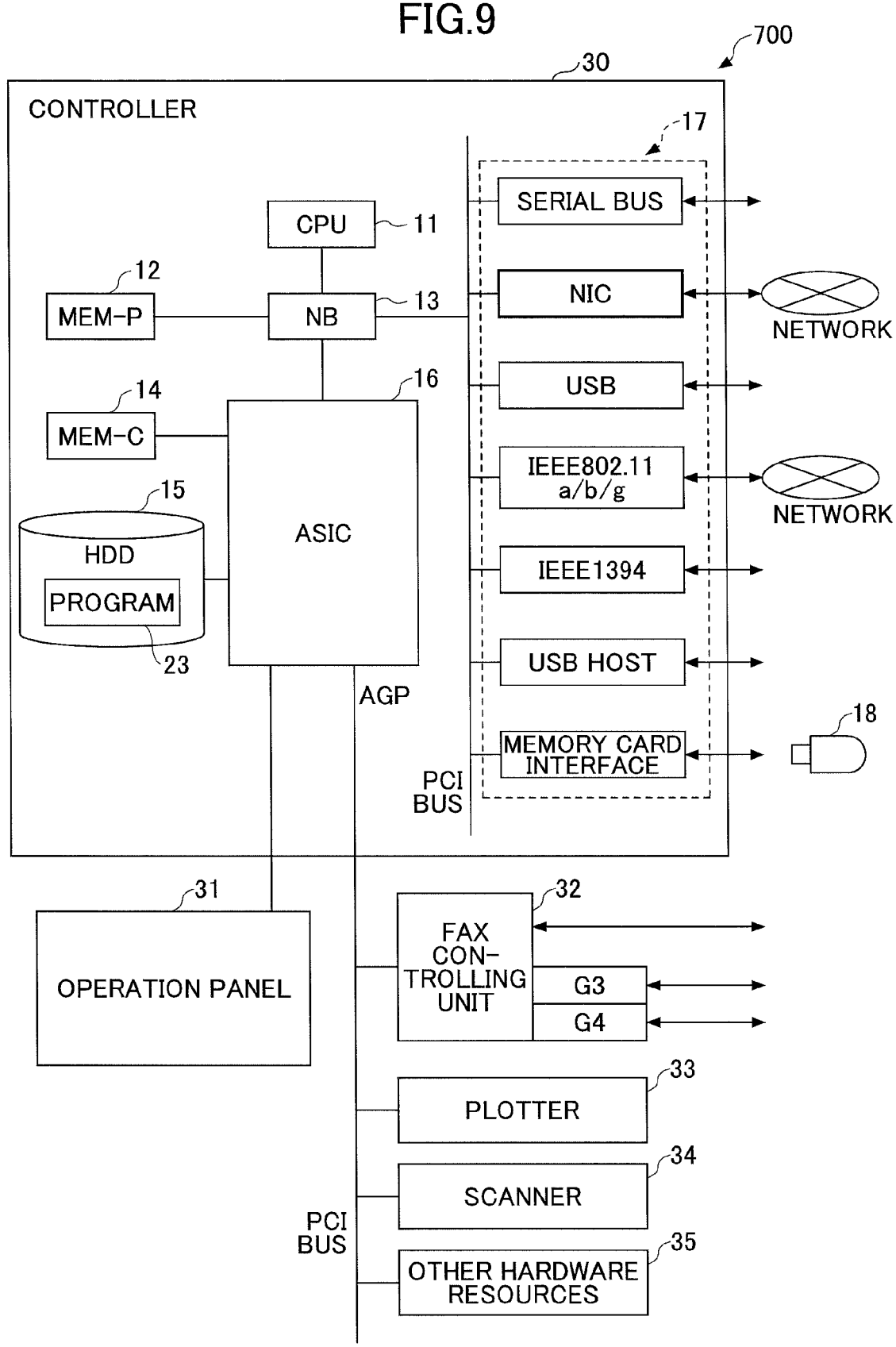
FIG. 9 is a hardware configuration diagram of a multifunction peripheral (MFP) when a color tone conversion parameter generating system consists of one MFP.

FIG. 9 is a hardware configuration diagram of a multifunction peripheral (MFP) 700 when the color tone conversion parameter generating system 600 consists of a single MFP. The MFP 700 includes a controller 30, an operation panel 31, FAX controlling unit 32, a plotter 33, a scanner 34, and other hardware resources 35. The controller 30 includes an CPU 11, a MEM-P 12, an NB 13, an ASIC 16, a MEM-C 14, an HDD 15, and peripheral devices 17 connected to the NB 13 via PCI bus.

In the controller 30, the ASIC 16 has connections with the MEM-C 14, the HDD 15, and the NB 13. The NB 13 has connections with the CPU 11 and the MEM-P 12. The NB 13 is one chip of the CPU chipset which is a bridge for connecting the CPU 11, the MEM-P 12, the ASIC 16, and peripheral devices.

The ASIC 16 is an integrated circuit (IC) chip for various kind of image processing. The ASIC also has a role of bridge for connecting an AGP, the HDD 15, and the MEM-C 14, respectively. The CPU controls the MFP 700 as a whole, while it activates and executes various programs implemented on the MFP 700.

The MEM-P 12 is a system memory used by the system of the MFP 700 and the MEM-C 14 is a local memory used as buffer while processing the image data.

The HDD 15 is a mass storage device, which may be replaced with SSDs. The HDD 15 stores the OS, various application programs, and various data including font data. The HDD 15 also stores a program for generating color tone conversion parameters. The program 23 is distributed by the storage media 18 or downloaded from servers not illustrated here. The HDD 15 also stores a database 49 which includes color reproduction range information as described later. The color reproduction range information may be downloaded from servers not illustrated here.

The Peripheral devices 17 include a serial bus, a NIC, a USB host, IEEE802.11a/b/g/n, IEEE1394, and a memory card interface. The serial bus may be connected to a Centronics cable. The NIC controls communication via network. The USB host is connected an USB device via USB cable. IEEE802.11a/b/g/n are interfaces for wireless LAN that control wireless communication. IEEE1394 is an interface for controlling high-speed serial communication. A memory card interface loads various memory cards, and reads/writes data from/to the cards. Memory cards include, for example, SD cards, multimedia cards, xD cards, and the like.

The operation panel 31 includes a hardware keyboard and a display device such as an LCD display. The operation panel 31 receives input operations from a user, and displays various information on the screen. The operation panel 31 may have a touch panel, which may be used as a software keyboard for user operations.

The FAX controlling unit 32 is connected to a public communication network via a network control unit (NCU). The FAX controlling unit 32 may send/receive facsimile according to communication protocols for G3/G4 compliant facsimile. The FAX controlling unit 32 may apply signal processing such as data compression or modulation to sending image data, or may apply signal processing such as data expansion or error correcting to receiving data to recover the image data.

The plotter 33 is, for example, a monochrome or color electrophotographic plotter which forms and transfer pages of image data onto paper according to the data to be printed or the data captured by the scanner 34. For example, the plotter may adopt an electrophotographic process using laser beam. In this case, it may form a tonner image on a photoconductive drum, then transfer the image onto paper, finally fix the image by applying heat and pressure to the image using a fixing device. Instead, ink droplets may be applied for printing.

The scanner 34 scans an original image copy that is set on a contact glass, then applies analog/digital (A/D) conversion on reflected light, execute publicly known image processing techniques to obtain the digital image data with a prescribed resolution.

Correspondences between units in FIG. 7 and FIG. 9 are as follows. The image input unit 601 in FIG. 7 and the scanner 34 in FIG. 9 correspond to each other. Similarly, the image input unit 602 and the plotter 33, the image storing unit 603 and the HDD 15, the image analyzing unit 604 and the CPU 11, the parameter storing unit 605 and the HDD 15, and the image processing unit 606 and the ASIC 16, correspond to each other, respectively.

Figure 10:
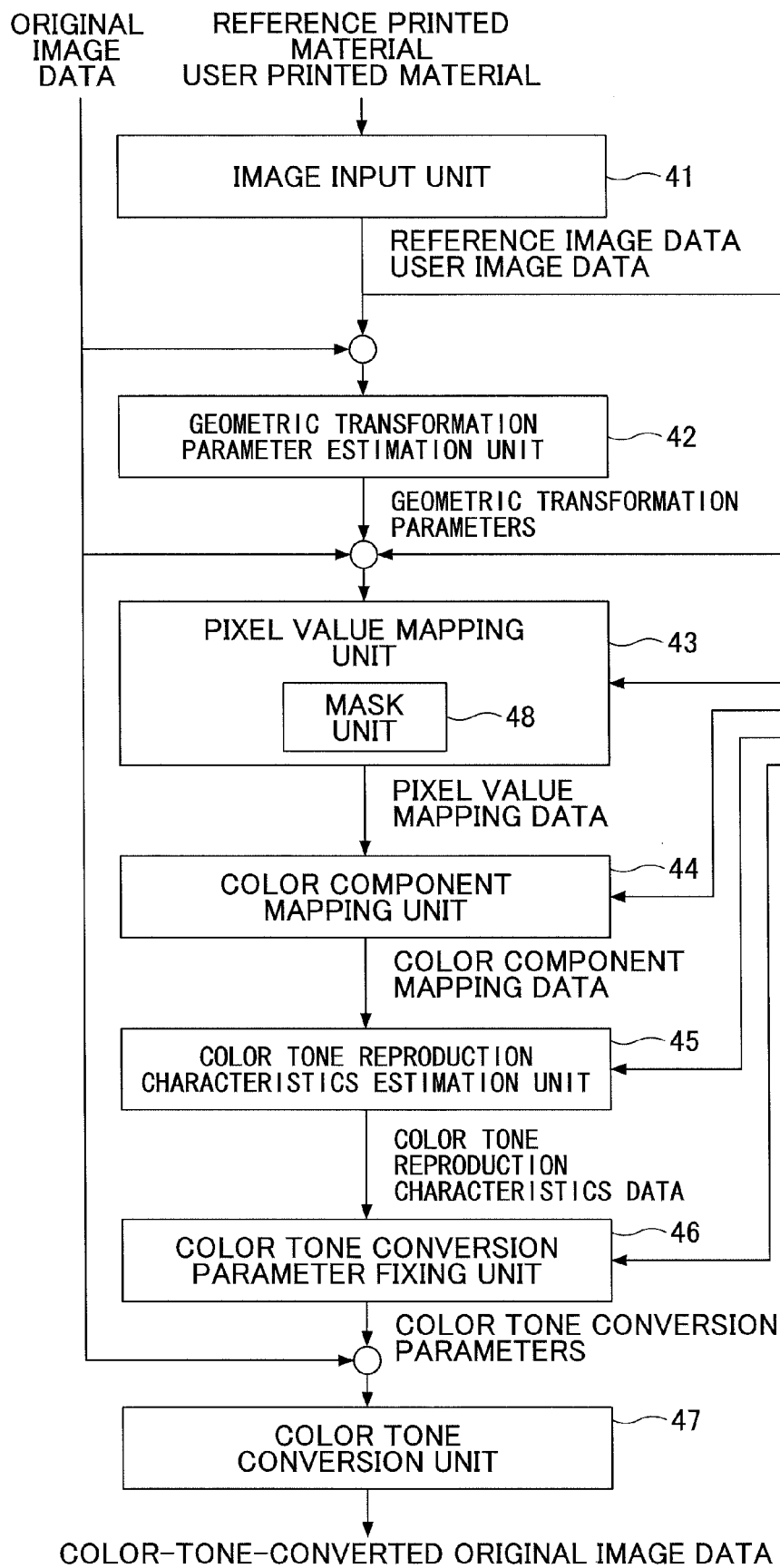
FIG. 10 is a functional block diagram of a color tone conversion parameter generating system, or an MFP.

FIG. 10 is a functional block diagram of the color tone conversion parameter generating system 600, or the MFP 700 that includes an image input unit 41, a geometric transformation parameter estimation unit 42, a pixel value mapping unit 43, a color component mapping unit 44, a color tone reproduction characteristics estimation unit 45, a color tone conversion parameter fixing unit 46, and a color tone conversion unit 47.

The image input unit 41 captures the reference printed material and the user printed material which are output results of the original image data, and generates the reference image data and the user image data.

The geometric transformation parameter estimation unit 42 estimates geometric transformation parameters between the original image data and the reference image data, or between the original image data and the user image data.

The pixel value mapping unit 43 identifies pairs of a pixel in the original image data and a pixel in the reference image data that have the same position in the respective images, using the geometric transformation parameters. Then, the pixel value mapping unit 43 generates pixel value mapping data between these pairs of pixel values. Similarly, the pixel value mapping unit 43 identifies pairs of a pixel in the original image data and a pixel in the user image data that have the same position in the respective images, using the geometric transformation parameters. Then, the pixel value mapping unit 43 generates pixel value mapping data between these pairs of pixel values. The pixel value mapping unit 43 has the mask unit 48.

Using the pixel value mapping data, the he color component mapping unit 44 determines corresponding color components between the color components in the original image data and the color components in the reference image data, and corresponding color components between the color components in the original image data and the color components in the user image data. The color component mapping unit 44 generates color component mapping data from the determined correspondences.

The color tone reproduction characteristics estimation unit 45 estimates color tone reproduction characteristics data using the color component mapping data.

The color reproduction range information database 49 stores the color reproduction range information of the reference printer and user printer. The color reproduction range information database 49 is accessible from the pixel value mapping unit 43, the color component mapping unit 44, the color tone reproduction characteristics estimation unit 45, and the color tone conversion parameter fixing unit 46.

The color tone conversion parameter fixing unit 46 fixes color tone conversion parameters using the color tone reproduction characteristics data.

The color tone conversion unit 47 applies a color conversion to the original image data.

[Steps of the Processing]

*Estimation of color tone reproduction characteristics

Figure 11:
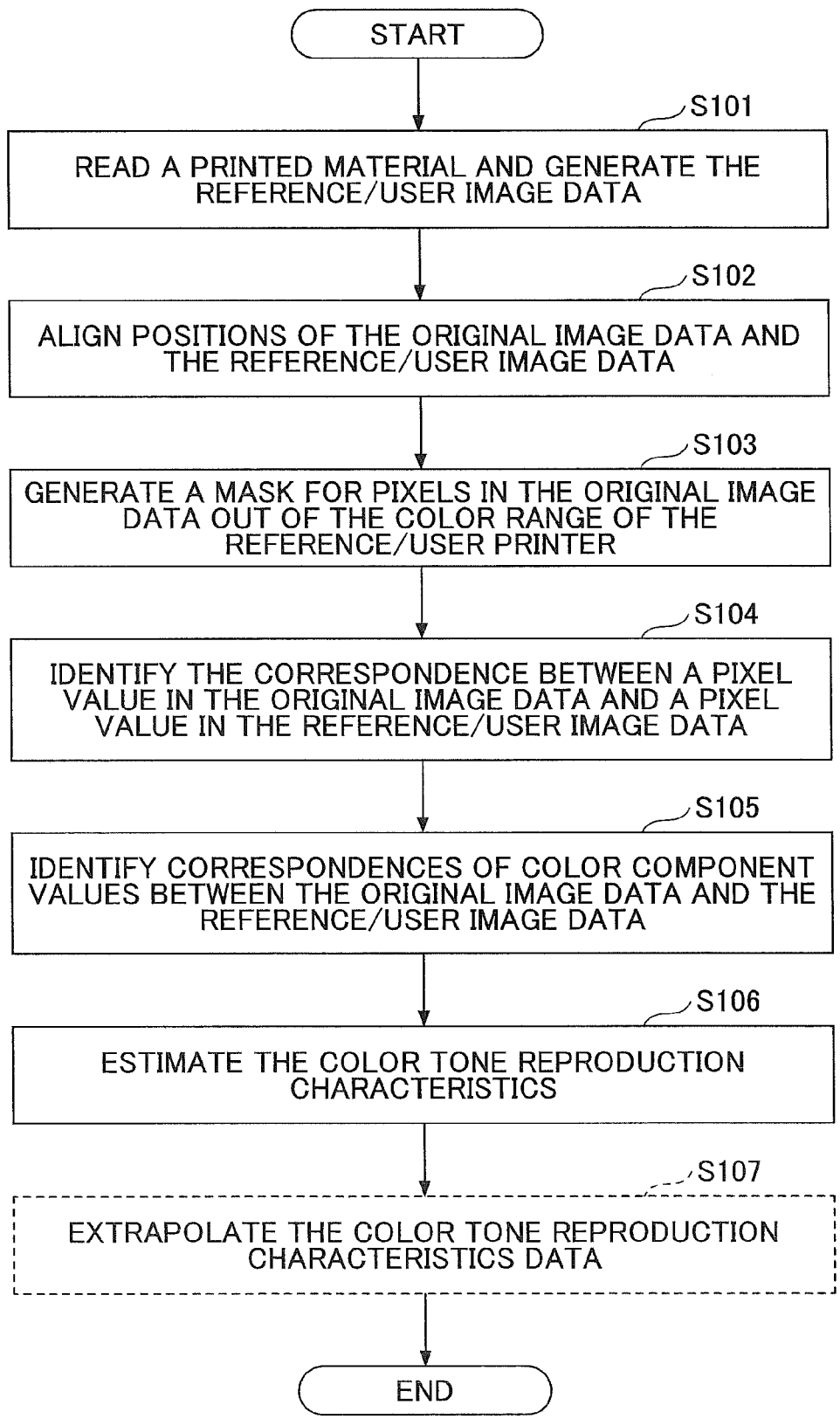
FIG. 11 is a flowchart illustrating a procedure in which an image input unit captures a reference printed material and a user printed material, then, a color tone reproduction characteristics estimation unit generates color tone reproduction characteristics data.

FIG. 11 is a flowchart illustrating a procedure in which the image input unit 41 captures a reference printed material and a user printed material, then, the color tone reproduction characteristics estimation unit 45 generates color tone reproduction characteristics data. In the following description, the processing of the reference printed material and the processing of the user printed material will be explained in parallel, although these may be executed in series in practice.

The image input unit 41 captures the reference printed material and the user printed material, and generates the reference image data and the user image data at Step S101.

The geometric transformation parameter estimation unit 42 aligns positions of the original image data and the reference image data, and positions of the original image data and the user image data at Step S102.

Before aligning positions of two image data, the geometric transformation parameter estimation unit 42 determines geometric transformation parameters for the reference or user image data, with using the original image data as reference. Examples of geometric transformation parameters include displacement, rotation angle, or magnification. Geometric transformation parameters may be estimated with publicly known techniques including methods using markers, or methods which do not use markers such as pattern matching methods or phase only correlation methods.

a) Method Using Markers

Image data is printed with markers, called "registry guides", placed on four corners and/or the center of each side of the image data. After capturing the reference image data and the user printed material printed with registry guides, misalignments of the registry guides are used to determine the displacement, the rotation angle, or the magnification.

FIG. 12A is a schematic view illustrating a usage of registry guides. Image data with four to six registry guides is printed on a sheet of paper. If the relative position of each registry guide in the original image data is the same as the relative position of each registry guide in the user image data, the geometric transformation parameters are determined by comparing misalignments of the corresponding registry guides. The position of a registry guide on the paper can be detected by screening a predetermined range from the paper side as the approximate position of the registry guide is already known.

FIG. 12B is a schematic view illustrating a misalignment of a registry guide. Pn, where n is an integer greater than or equal to 1, represents the position of a characteristic point in a registry guide in the original image data. qn represents the position of a characteristic point in a registry guide in the reference image data. If there is no misalignment, each pair of points such as P1 and q1, P2 and q2, P3 and q3, and so on, has the same position. In this case, publicly known methods may be used to determine the correspondence between points, which is used to obtain the geometric transformation parameters. It is known two sets of points can be matched by applying, for example, an affine transformation to one of two images. Therefore, to obtain the geometric transformation parameters, it is sufficient to search for optimal affine parameters that best approximate the positions of corresponding points in two set of points. For example, an evaluation function of affine parameters for points P1 to P6 may be predetermined. The affine parameters with which the evaluation function takes a minimal value may be considered as the best parameters.

b) Pattern Matching Method

A pattern matching method, called "template matching method", may be used if only the displacement needs to be estimated. The template matching method takes one of the images as a template, shifts the position of the template gradually while calculating the degree of coincidence with another image, and searches for the optimal position where the degree of coincidence takes the maximal value. When other parameters than the displacement are required, a method for estimating rotation angle such as Hough transform, or a method for estimating magnification such as multi-scale analysis may need to be used in combination with the template matching method.

An applied template matching method, called "block matching method", divides one of the images into blocks. The method estimates the displacement of each block by searching for the optimal position where the degree of coincidence with another image takes the maximal value. The method may be used to estimate the rotation angle or the magnification from block-wise displacements.

c) Phase Only Correlation Method

To estimate displacement, rotation angle, and magnification with high precision, one may use a method called "phase only correlation method" (POC), or "rotation invariant phase only correlation method" (RIPOC). POC uses phase images obtained by applying discrete Fourier transformation to images. POC estimates the displacement of two images under comparison by searching for the position where the correlation of two phase images takes the highest value. RIPOC, a variation of POC, uses phase images transformed into log-polar coordinates from which the rotation angle and the magnification are estimated as the displacement in the transformed coordinates.

After obtaining the geometric transformation parameters as above, the geometric transformation parameter estimation unit 42 applies the transformation to the reference or user image data. In case that pixels do not have one-to-one correspondence before and after the transformation due to sub-pixel level shifts, or some sort of rotation or magnification, in-between pixel values may be properly obtained with interpolation such as bilinear interpolation or bicubic interpolation.

It is noted that the execution of geometric transformation is not an indispensable part of Step S102. The transformation itself may be executed in the next step when obtaining pixels at the same position in the original image data, and the reference or user image data. The coordinate transformation may be executed at this timing using the geometric transformation parameters. This is an alternative way to judge whether the pixels are at the same position or not. In other words, two pixels in different images are treated as having the same position even if they have different coordinates in their respective coordinate system according to the origin of the respective image, as long as they have the same coordinates after applying the geometric transformation to the images.

There may be blank spaces on sides of a printed material obtained from the original image data. These blank spaces are not referred to because the displacement includes the height and width of blank spaces. Or these blank spaces may be removed from the output image data so that the images have the same position of the origin.

Next, the mask unit 48 generates a mask for pixels in the original image data out of the color range of the reference or user printer at Step S103.

In the present embodiment, the color reproduction range information of the reference or user printer is given beforehand. The color reproduction range of a printer may be given as a subspace of a predetermined color space such as RGB, XYZ, or L*a*b*, and the like. In case of an RGB color space, for example, the color reproduction range is given by the minimum and maximum values of R, G, and B, respectively. The color reproduction range information may be taken from the specification determined at the design phase of the reference or user printer. Or the actual color reproduction range may be measured by a colorimeter.

The mask unit 48 determines if a pixel value of a pixel or a group of pixels in the original image data is contained in the color reproduction range. For example, a mask is provided whose size is the same as the original image data, and each pixel has one bit to indicate whether the corresponding pixel in the original image data is contained in the color reproduction range. If that is the case, the bit is set to "1".

Figure 13:
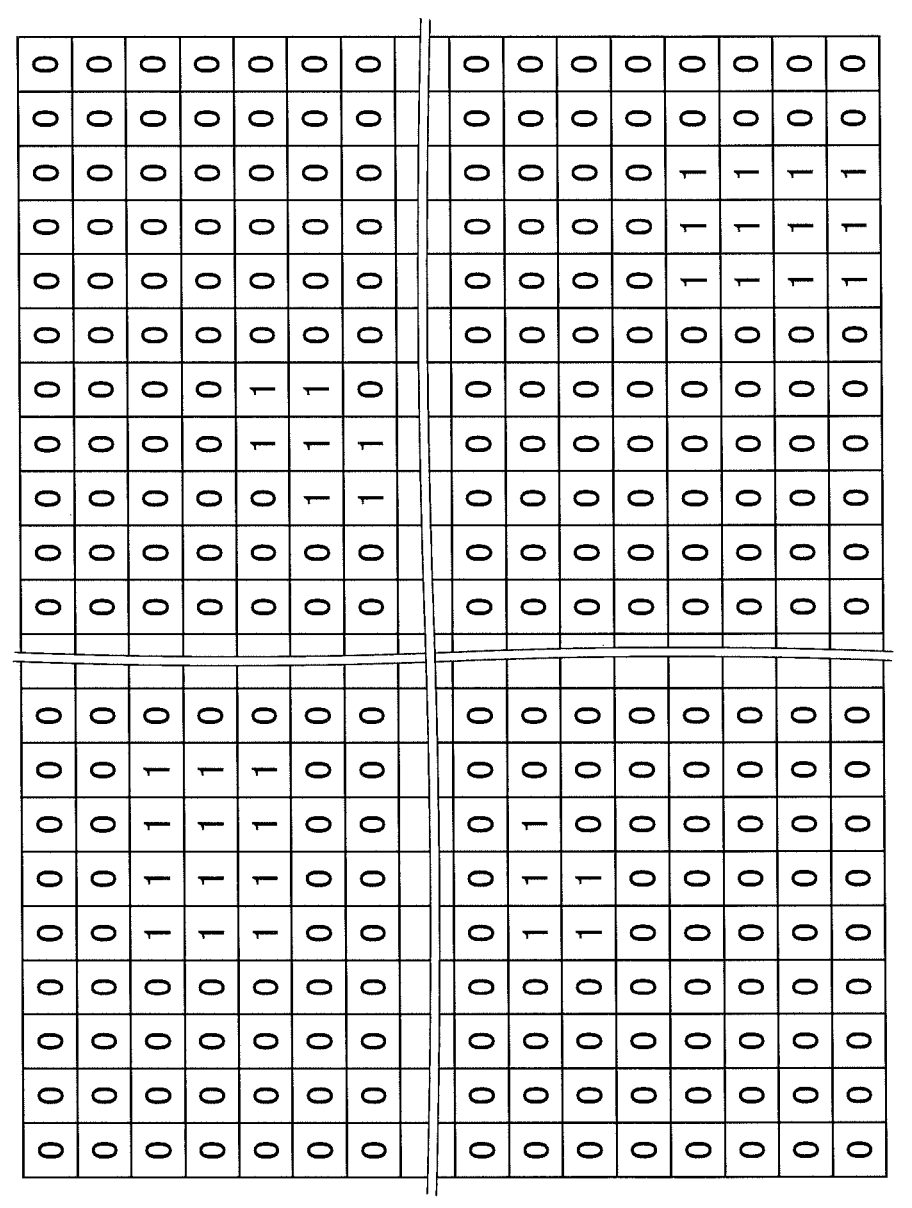

FIG. 13 is a schematic view of mask data. The initial value of all the pixels in the mask is set to "0". Then, each pixel or each group of pixels in the original image data is examined one by one. If the examined pixel value is not contained in the color reproduction range, the corresponding bit in the mask is set to "1". If the examined pixel value is contained in the color reproduction range, the corresponding bit in the mask remains at the value "0". Therefore, in the next step, the pixel value mapping unit 43 can determine whether a pixel value in the original image data and a pixel value in the reference or user image data at the same position have a correspondence, by referring to the mask. It is noted that the meaning of "1" or "0" of a bit in the mask may be interchanged. Or, more than one bit may be allocated to indicate whether a pixel value is not contained in the color reproduction range.

Next, the pixel value mapping unit 43 identifies the correspondence between a pixel value in the original image data and a pixel value in the reference or user image data at the same position at Step S104. Having completed the alignment of the position for the original image data and the reference or user image data, the pixel value mapping unit 43 obtains corresponding pixel values in two images to generate the pixel value mapping data.

First, the pixel value mapping unit 43 refers to a bit in the mask whose position is the same as a pixel in the original image data to check the value of the mask bit is "1" or not. The fact that the mask bit is "1" means that the pixel in the original image data does not have the correspondence. Therefore, the pixel value mapping unit 43 does nothing, i.e., just neglects the pixel value of the pixel. In case of not "1", correspondences are identified as will be explained later. In this way, by estimating the color tone reproduction characteristics only using the pixels included the color reproduction range of the reference or user image data, a possible degradation of precision of the estimation of the color tone reproduction characteristics is avoided. Otherwise, the degradation could be caused by pixels out of the color reproduction range In case that the alignment of the image data is done after the geometric transformation has been applied to the image data, the corresponding pixels mean the pixels at the same position. On the other hand, in case that the geometric transformation has not been applied to the image data, one of two pixels may be applied the coordinate transformation and if the transformed position is the same as the non-transformed position of another pixel, these two pixels are regarded as the corresponding pixels.

Pixel value mapping data may be recorded in several ways, for example, a recording in list format, or a recording in matrix format. It is assumed that both the original image data and the reference or user image data are RGB images whose color components have 256 shades.

a) Recording in List Format

Color component values are recorded in list format as follows:

a-1) Provide three copies of list format.

a-2) Select a pair of coordinate values in the original image data.

a-3). Add a pair of R component values to a first list format for R components. The added pair consists of R component value of the pixel at the coordinate values selected in a-2 in the original image data, and R component value of the corresponding pixel in the reference or user image data.

a-4) Similarly, G components and B components are added to a second list format for G component and a third list format for B component, respectively.

a-5) Iterate the above steps for all the coordinate values in the original image data.

These list formats may be sorted in ascending or descending order if necessary.

b) Recording in Matrix Format

Correspondence relationships of color component values are determined by voting on matrices as described in the following steps. The vertical axis in a matrix represents values in the original image data, and the horizontal axis in a matrix represents values in the reference or user image data.

b-1) Provide three copies of matrix format with 256 rows and 256 columns.

b-2) Select a pair of coordinate values in the original image data.

b-3) Cast one vote to a position in a matrix for R-component whose row number is equal to the value of the pixel at the coordinated selected at b-2), and the column number is equal to the value of the corresponding pixel in the reference or user image data.

b-4) Similarly, voting for the correspondence of G-component values is done on a matrix for G-component, voting for the correspondence of B-component values is done on a matrix for B-component, respectively.

b-5) Iterate the above steps for all the coordinate values in the original image data.

Specifically, suppose a pixel at certain coordinate values in the original image data has R-G-B pixel value of (128, 130, 132), and the corresponding pixel in the reference or user image data, has R-G-B pixel value of (132, 130, 126). In this case, one vote is cast to the row 128 and the column 132 in the matrix for R-component, one vote is cast to the row 130 and the column 130 in the matrix for G-component, and one vote is cast to the row 132 and the column 126 in the matrix for B-component. It is noted that the assignment of axes is interchangeable, may be determined as appropriate.

To simplify the processing, coordinate values in the original image data may be restricted to a certain range of values, or values at predetermined intervals, instead of iterating all the values. This simplification is applicable to both the list format and the matrix format.

Next, the color component mapping unit 44 identifies correspondences of color component values between the original image data and the reference or user image data, in Step S105. Using the pixel value mapping data, the color component mapping unit 44 generates the color component mapping data by identifies the correspondence of a color component value in the original and a color component value in the reference or user image data.

In a similar way as in Step S102, the following explanation assumes the original image data and the reference or user image data are RGB images whose color components have 256 shades.

a) List Format

In case that the pixel value mapping data is recorded in the list format, the following steps are executed.

a-1) Select a value in a color component in the original image data.

a-2) Obtain the list corresponding to the color component selected at a-1).

a-3) Obtain all the records corresponding to the value selected at a-1) from the list obtained at a-2).

a-4) Synthesize a color component value of the reference or user image data from all the records obtained at a-3.

a-5) Record the correspondence between the color component value in the original image data selected at a-1) and the value synthesized at a-4) as an element in the color component mapping data.

a-6) Iterate the above steps for each value of each color component.

If only one record is obtained at a-3), the color component mapping unit 44 uses the obtained record value at a-4) as it is.

If multiple records are obtained at a-3), values in the reference or user image data, are synthesized into one value. Multiple values are synthesized by methods such as a method using the average value, a method using the mode, or a method using the median.

b) Matrix Format

In case that the pixel value mapping data is recorded in the matrix format, the following steps are executed.

b-1) Select a value in a color component in the original image data.

b-2) Obtain the matrix corresponding to the color component selected at b-1).

b-3) Obtain the row corresponding to the value selected in b-1) from the matrix obtained at b-2).

b-4) Synthesize a value from the values at the voted column in the row obtained at b-3).

b-5) Record the correspondence between the color component value in the original image data selected at b-1) and the synthesized value at b-4) as an element the color component mapping data.

b-6) Iterate the above steps for each value of each color component.

If only one column has votes in the obtained row at b-4), the color component mapping unit 44 adopts the column number as the synthesized value. If multiple columns have votes in the obtained row at b-4), these are synthesized into one value before utilization. Methods used for synthesis are similar to those for a), except that the number of votes is used as the number of appearances of the column number.

It is desirable to record if there are color component values not used in the original image data. This information may be utilized in the next step.

Figure 14A:
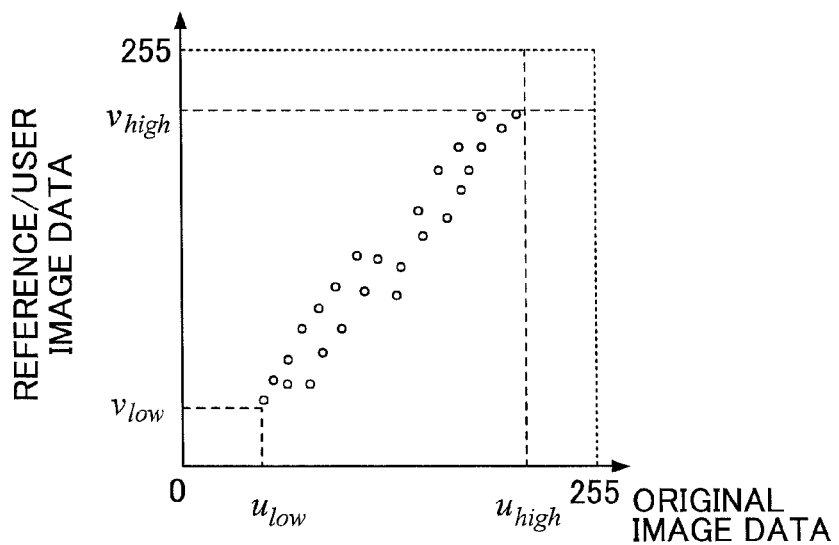
FIG. 14A, FIG. 14B, and FIG. 14C are schematic views illustrating data designating the correspondence between color component values of original image data and color component values of reference image data, or user image data.

FIG. 14A is a schematic view illustrating the color component mapping data between the original image data and the reference or user image data. As a result of masking pixel values in the original image data out of the color reproduction range, colors below $u_{low}$ or above $u_{high}$ in the original image data have no corresponding pixel values in the reference or user image data. Therefore, these colors below $u_{low}$ or above $u_{high}$ in the original image data are treated as follows:

a) Color tone conversion is not applied to colors below $u_{low}$ or above $u_{high}$ in the original image data. Although the processing described later generates color tone conversion parameters, those colors not included in color tone conversion parameters will be printed as in the original image data.

b) The pixel value mapping data is extrapolated. For colors below $u_{low}$ or above $u_{high}$, colors in the pixel value mapping data are extrapolated. Thus, the pixel values in the original image data which are out of the reproduction range of the reference or user printer, are treated properly. The extrapolation will be explained following the explanation of color tone reproduction characteristics data, as the extrapolation is applied to color tone reproduction characteristics data.

Next, the color tone reproduction characteristics estimation unit 45 estimates color tone reproduction characteristics in Step S106, using a series of data elements in the color component mapping data. The color tone reproduction characteristics may use the color component mapping data as it is, or with some modification. The purpose of modification is to curb an extreme variation of values, or to improve the stability of the characteristics curve.

Examples of modification of the color component mapping data are as follows:

a) Moving Average

This is a method to take a weighted average of a series of data elements including the data element under consideration and data elements before and after. The range of data elements may be determined according to required smoothness of values of data series. The smoother the values of data series are required to be, the wider the range needs to be. The weight for taking an average may be the same to all the data elements, or inversely proportional to the distance from the data element under consideration.

Before taking a moving average, a series of data elements needs to be sorted in ascending order, or descending order. In addition, if there are color component values not used in the original image data, some data elements may be lacking after the sort. These lacking elements should be excluded before taking a weighted average so that these elements will not affect the other data elements. The lacking elements may be identified by checking whether the data elements are continuous or not, or by using the information about unused color component values recorded at the previous step.

b) Approximation by Line or Curve

A series of data elements may be approximated by using linear function, quadratic function, spline function, or exponential function.

c) Interpolation or Approximation by Line or Curve With Reduced Number of Shades The number of shades used in a series of data elements in the color component mapping data may be reduced by the following methods:

A) The range of shades is partitioned into equal intervals into which several shades are included and integrated. The number of partitions and/or the width of a partition may be predetermined or determined dynamically.

Figure 15A:
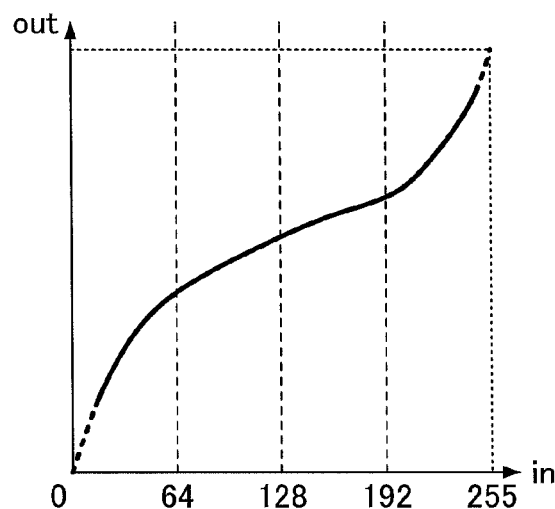
FIG. 15A, FIG. 15B, and FIG. 15C are schematic views illustrating cases in which the number of partitions and/or the width of a partition are predetermined.

A-1) Case with predetermined number of partitions, or predetermined width of a partition FIG. 15A is a schematic view illustrating a case in which the number of partitions and/or the width of a partition are predetermined. In FIG. 15A, 256 shades from 0 to 255 are partitioned into a predetermined number of partitions, four, in this case. Shades are divided into four partitions including shades of 0 to 63, 64 to 127, 128 to 191, and 192 to 255, respectively. Each partition includes 64 shades that will be reduced to one shade, or treated as having the same conversion characteristics. It is noted that giving a predetermined value of the width of a partition has the same effect.

A-2) Case with dynamically determined number of partitions, or width of a partition partitions The number of partitions or the width of a partition with equal intervals may be determined by taking the number of pixels into account. For example, the number of partitions may be obtained by dividing the number of pixels by a predetermined empirically-derived number.

B) the Range of Shades is Partitioned into Unequal intervals into which several shades are included and integrated.

Using the number of votes in the pixel value mapping data, the width of partition is adaptively determined so that integrated shades have the sum of votes equal to a predetermined number.

Figure 15B:
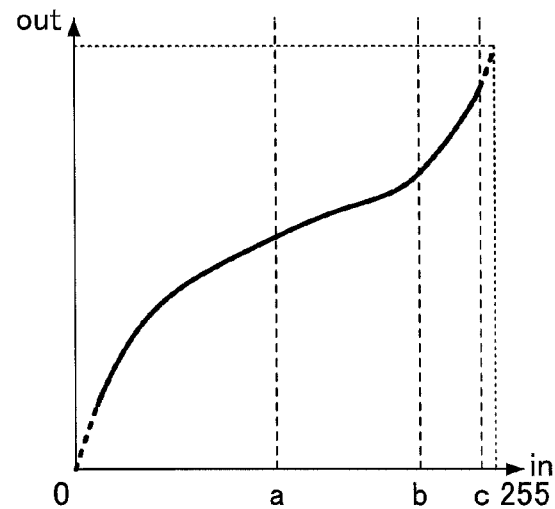

FIG. 15B illustrates an example of four partitions with unequal intervals in which 256 shades from 0 to 255 are partitioned into the ranges of 0 to a, a to b, b to c, and c to 255. Each range is reduced to a single shade. It is noted that the shade a, b, or c may be included in either one of the partitions beside it, determined as appropriate.

There are a couple of methods to determine the number of shades with unequal interval partition. One method may divide accumulated frequency of pixels belonging to the shades into equal intervals. Another method may use a histogram of pixels belonging to the shades.

i) Method Using Accumulated Frequency of Pixels Belonging to the Shades

This method may divide accumulated frequency of pixels belonging to shades into equal intervals. Then, the method uses the shades at delimiting positions for partitioning.

Figure 15C:
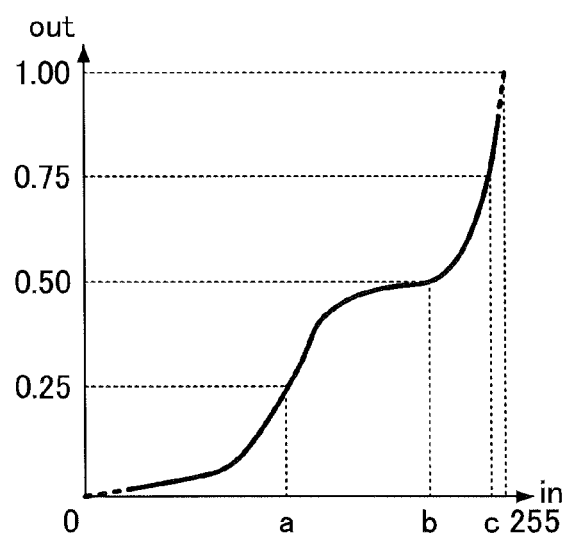

FIG. 15C illustrates an example of four partitions into which 256 shades ranging from 0 to 255 are distributed with unequal intervals. Taking 1.0 as the maximum value of the accumulated frequency on the vertical axis, shades at delimiting positions for partitioning are determined to be those shades at 0.25, 0.50, 0.75, which are the shade "a", "b" and "c", respectively. According to this partitioning, the number of data elements is the same for each partition. This means each transformation characteristics will be given to the same number of pixels.

ii) Method Using a Histogram of Pixels Belonging to Shades

Figure 16A:
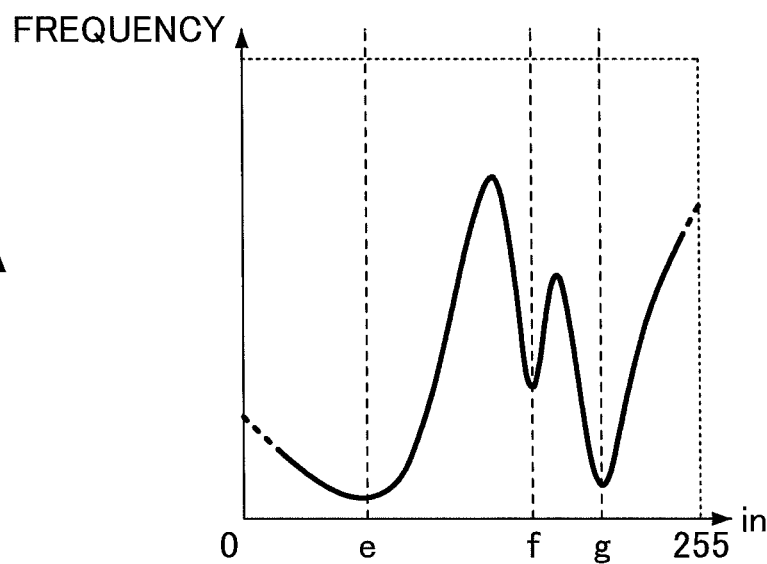
FIG. 16A and FIG. 16B are schematic views illustrating reduction of the number of shades in original image data.

FIG. 16A illustrates the method that makes a histogram of pixels belonging to shades, then partitions at shades of e, f, g, which have minimal frequencies. According to this partitioning, the number of switching of transformation characteristics may be reduced.

After reducing the number of shades, an interpolation or a line/curve approximation will be used to recover the original number of shades from the integrated shades.

Figure 16B:
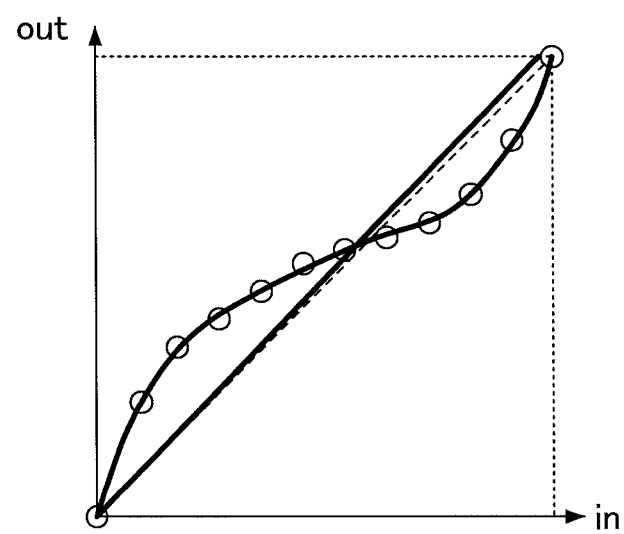

FIG. 16B illustrates an example of recovering the original number of shades from the reduced shades by using linear approximation or curve approximation. Circles show integrated data items. The solid line shows an example of linear approximation. The solid curve shows an example of curve approximation. It is desirable to select a function used for approximation according to the tendency of integrated data items. By using interpolation or line/curve approximation in this way, peculiar conversions may be excluded from estimated transformation characteristics. A peculiar conversion may be caused by a small number of pixels.

Next, extrapolation of color tone reproduction characteristics data will be explained. Discontinuous color component mapping data as shown in FIG. 14A are transformed into continuous color tone reproduction characteristics data by applying the processing of S106. However, for those pixel values below $u_{low}$ or above $u_{high}$ in the original image data, it remains unchanged that color tone reproduction characteristics data is not obtained. The color tone reproduction characteristics data for these ranges will be obtained using extrapolation at Step S107 as follows.

Figure 14B:
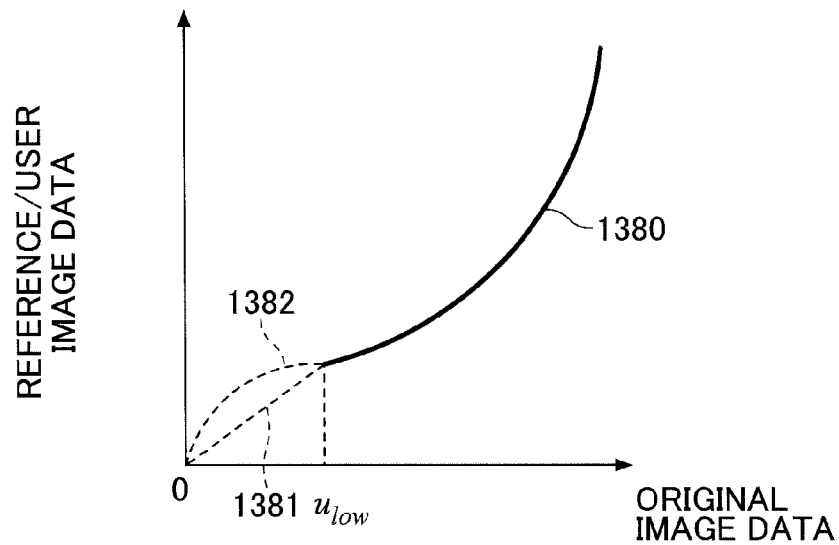
Figure 14C:
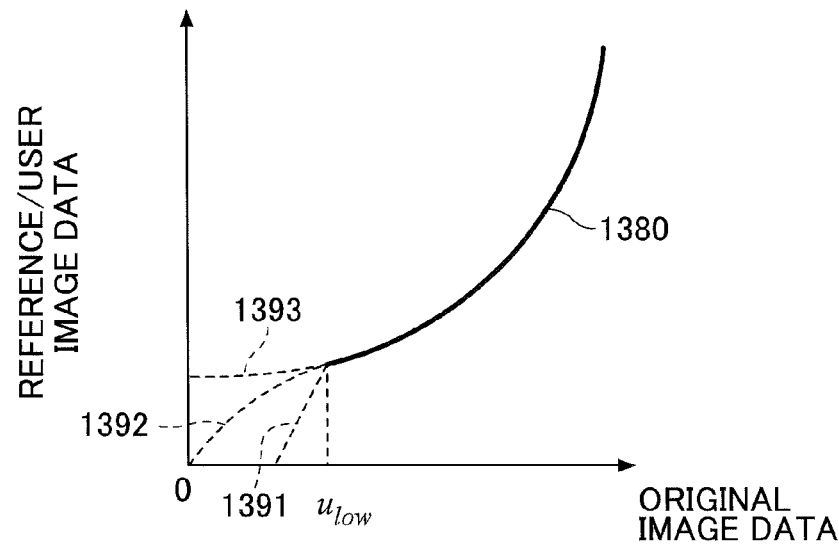

FIGS. 14B and 14C illustrate extrapolation of color tone reproduction characteristics data. It is noted that extrapolation may not be necessary if the range not covered by the color tone reproduction characteristics is corrected when obtaining the color tone conversion parameter, as will explained in a later embodiment.

Two methods of extrapolation will be explained assuming that the original image data is in an RGB color space with 256 shades.

a) The first extrapolation method uses a function for converging into the maximum value or the minimum value in the color reproduction range. The solid curve 1380 in FIG. 14B shows an estimated color tone reproduction characteristics data from existing pixel values. The color tone reproduction characteristics estimation unit 45 may connect the lower end of the solid curve 1380 and the minimum value of 0 with a line 1381, or with an extrapolated curve 1382 calculated using a predetermined function. The upper end of the solid curve 1380 is similarly extrapolated towards the maximum value of 255.

b) The second extrapolation method uses a function which may not be bound to the maximum value or the minimum value in the reproduction range, as explained in FIG. 14C. For example, the line 1391 with the slope value of 1 may be used as an extrapolation line between the lower end of the solid curve 1380 and the x-intercept or y-intercept. Or the line 1393 having the same slope value as the slope value at the lower end of the solid curve 1380 may be another extrapolation line between the lower end of the solid curve 1380 and the x-intercept or y-intercept. Or an extrapolation curve 1392 may be used for the same interval. The curve 1392 approximates the neighborhood around the lower end of the solid curve 1380. It is noted in case that one of these extrapolation lines 1391, 1393 or the curve 1392 intersects with the x-axis, i.e., the line or curve has an x-intercept, color tone conversion cannot be applied to pixel values ranging from 0 to the x-intercept. In this case, data elements below the x-intercept in the original image data do not need the color tone conversion.

*Determination of color tone conversion parameters

Next, determination of color tone conversion parameters will be explained.

Figure 17:
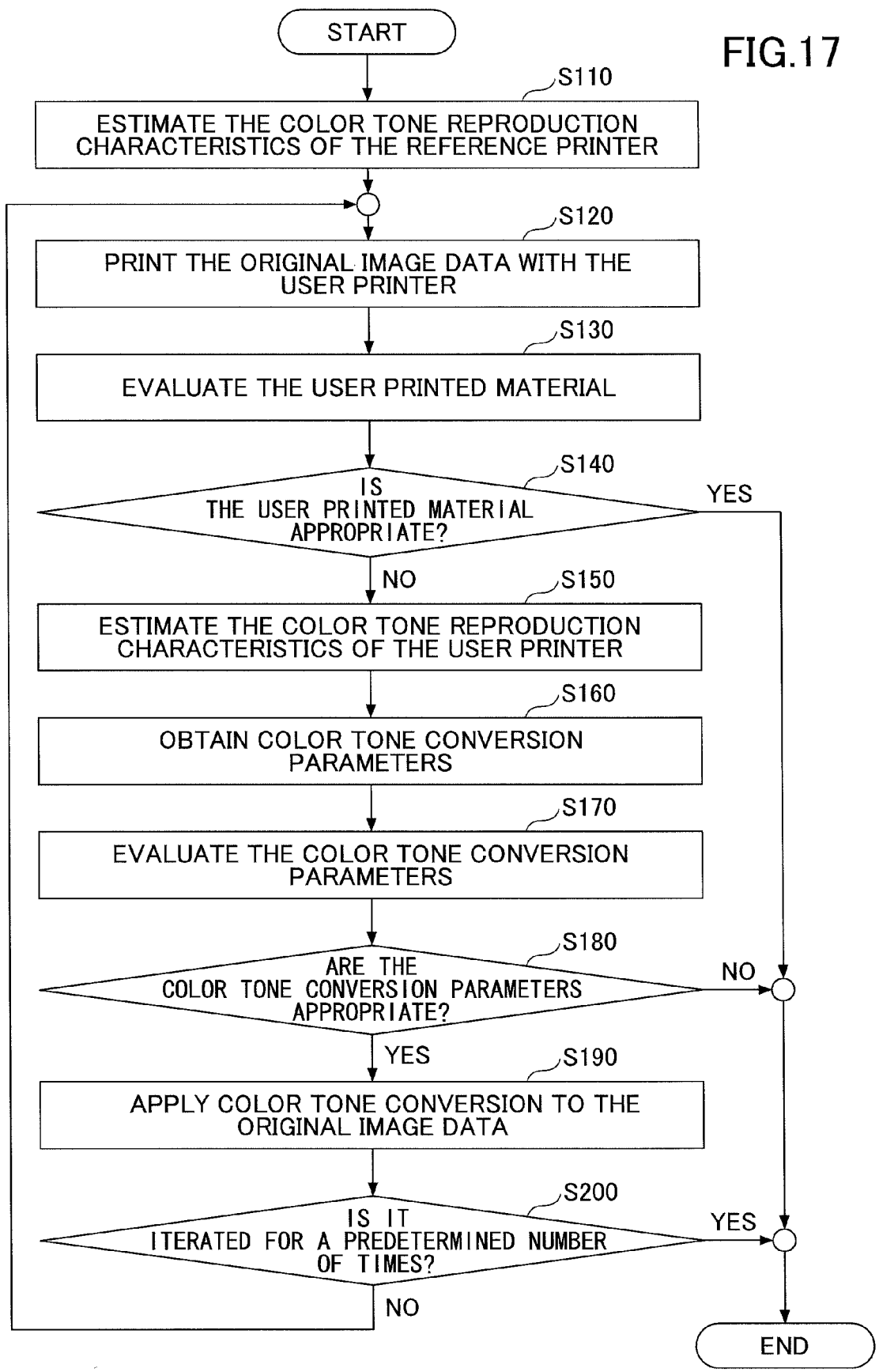
FIG. 17 is a flowchart illustrating the steps executed by a color tone conversion parameter generating system, or by an MFP, to generate color tone conversion parameters.

FIG. 17 is a flowchart illustrating the steps executed by the color tone conversion parameter generating system 600, or by MFP 700, to generate color tone conversion parameters.

First, Step S110, "Estimate the color tone reproduction characteristics of the reference printer", and Step S150, "Estimate the color tone reproduction characteristics of the user printer" have been explained with the steps in FIG. 11. It is noted that S110 and S150 may be executed just once. If executing multiple times, the original image data that is not the date after the color tone conversion should be used at S110 and S150.

Next, for example, a user may print the original image data with the user printer 200 at Step S120. By printing the original image data with the user printer 200, a user printed material is obtained. The user inputs the user printed material into the scanner 34 in FIG. 9 that corresponds to the scanner 300 in FIG. 3, simply referred to as the scanner 300 hereafter.

The color tone conversion parameter fixing unit 46 evaluates the user printed material at Step S130, then, compares the user printed material and the reference printed material to evaluate the quality of the user printed material at Step S140.

If the quality of the user printed material is sufficient, the branch labeled "YES" at S140 is taken and the processing ends. Otherwise, the branch labeled "NO" at S140 is taken and the processing proceeds to Step S150.

Methods to evaluate the quality of the user printed material may include a method using color difference with the reference printed material, a method using hue difference, or a method using the absolute value of the difference of each color component. It is noted that the evaluation of the quality may be done visually.

a) Method Using Color Difference

Color difference is the distance of two colors in L*a*b* color space or L*u*v* color space. Since the present embodiment uses printers as image output device, L*a*b* color space will be used in the following explanation.

The color difference in L*a*b* color space, $\Delta E^*a$, is defined by the following formula:

$$\Delta E^*{}_{ab} = \sqrt{(\Delta L^*)^2 + (\Delta a^*)^2 + (\Delta b^*)^2} \quad \text{[Formula 1]}$$

where $(\Delta L^*, \Delta a^*, \Delta b^*)$ are chromaticity differences between two colors in L*a*b* color space.

The following example illustrates steps to obtain the color difference between the reference printed material and the user printed material.

(1) Input the reference printed material into the scanner 300 and obtain the reference image data.
(2) Input the user printed material into the same scanner 300 and obtain the user image data.
(3) Convert the reference image data and the user image data into a device independent color space, such as XYZ color space, by using the color profile of the scanner 300.
(4) Convert the reference image data and the user image data converted into the device independent color space into L*a*b* color space.
(5) Obtain the color difference of each pixel using the above formula.

It is noted that two different scanners 300 may be used to scan the reference image data and the user image data, respectively, instead of the single scanner 300, under the condition that the data can be converted into a device independent color space using the color profile of scanners.

When using a single scanner 300, it may not be needed to convert into a device independent color space using the color profile of the scanner. When quantitatively evaluating the color difference, the conversion into a device independent color space is required because absolute values matter. When qualitatively evaluating the color difference, the conversion into a device independent color space may be skipped as it is sufficient to obtain a relative tendency.

After the color difference of each pixel is obtained, the information may be analyzed statistically to evaluate the quality of the user printed material quantitatively. Analysis methods may include those using the average value, the maximum value, the distribution, or the dispersion of color differences.

The quality may be judged as sufficient or not in the following ways:

The average value of color differences is within a predetermined range or not.
The maximum value of color differences is within a predetermined range or not.
The dispersion of color differences is within a predetermined range or not.

It is noted that when evaluating the user printed material, it is desirable that contours appearing in the image data is removed. This is because large color differences may appear in the contours due to the reasons as follows:
It is difficult to align the position of contours in a later step.
The reproduction of contours may differ from printer to printer, especially in tint of color or sharpness.
Since the area of contours occupies a very small portion when compared to the whole area of the printed material, the influence of the contours on overall visual evaluation of the color tone may be limited. On the other hand, in a quantitative evaluation, large color differences in the contours, or outliers, may reduce the reliability of evaluation results. Therefore, the removal of contours may be needed to produce evaluation results with higher precision.

Methods for detecting contours may include binarization, or edge detection. A method using binarization divides the image data into black and white areas according to a predetermined threshold value to determine contours where a black area and a white area are adjacently located. A method using edge detection generates edge image data using Sobel method and the like. Then, the method binarizes pixels with a predetermined threshold value, and determines contours where pixels have a pixel value above the threshold value.

There are relaxation methods for the above problem without removing contours. For example, a method may smooth the image data including contours to reduce the color difference appearing at contours. Smoothing may be done with conventional techniques such as averaging filter or low-pass filter.

b) Method Using Hue Difference

The hue difference in L*a*b* color space, $\Delta H^*ab$, is defined by the next formula:

$$\Delta H^*{}_{ab} = \sqrt{(\Delta E^*{}_{ab})^2 - (\Delta L^*)^2 - (\Delta C^*{}_{ab})^2} \quad \text{[Formula 2]}$$

where $\Delta E^*ab$ is the color difference, $(\Delta L^*, \Delta a^*, \Delta b^*)$ are chromaticity differences between two colors, and $\Delta C^*ab$ is the difference of chroma. Chroma, $C^*ab$, is defined by the next formula:

$$C^*{}_{ab} = \sqrt{(a^*)^2 + (b^*)^2} \quad \text{[Formula 3]}$$

The steps to obtain the hue difference between the reference printed material and the user printed material are almost the same as the steps to obtain the color difference, except for obtaining the hue difference instead of the color difference. Statistical analysis or quality judgment are also done with similar methods.

c) Method Using the Absolute Value of the Difference of Each Color Component

This method uses the absolute value of the difference of each color component between the reference printed material and the user printed material in a predetermined color space for the evaluation. Taking an RGB color space, for example, the method uses the difference of the absolute value of R-component, the difference of the absolute value of G-component, and the difference of the absolute value of B-component. The following steps illustrate an example of obtaining the absolute value of the difference of each color component between the reference printed material and the user printed material.

1) Input the reference printed material into the scanner 300 and obtain the reference image data.
2) Input the user printed material into the same scanner 300 and obtain the user image data.
3) Convert the reference image data and the user image data into a device independent color space, such as XYZ color space by using the color profile of the scanner 300.
4) Obtain the absolute value of the difference of each color component in the converted color space.

It is noted that it may not be needed to convert into a device independent color space using the color profile of the scanner as in case of the color difference. The absolute value of the difference may be obtained directly in the device dependent color space of the scanner 300. Also, statistical analysis or quality judgment are done with similar methods as done for the color difference.

The next step S150, "Estimate the color tone reproduction characteristics of the user printer 200", has already explained in FIG. 11.

Next, the color tone conversion parameter fixing unit 46 obtains color tone conversion parameters in Step S160, by combining the color tone reproduction characteristics data of the reference printer 400 and the user printer 200. Example steps are illustrated as follows:

(1) Select a color component value, say "a", in the original image data.
(2) Obtain a value in the reference image data, "s", from the color tone reproduction characteristics data of the reference printer 400 that corresponds to the selected value "a".
(3) Obtain a value in the original image data, "b", from the color tone reproduction characteristics data of the user printer 200 that corresponds to the obtained value "s".
(4) Record the correspondence of two values (a, b).
(5) Iterate above steps for each color component values in the original image data.

The color tone conversion parameters may be obtained by directly using or modifying the pairs of values obtained above.

a) Directly Using the Pairs of Values

The pairs of values are treated as a look-up table (LUT), which is used as the color tone conversion parameters.

b) Modifying the Pairs of Values

The values are modified with methods used in estimating the conversion characteristics such as moving average, line/curve approximation, or reduction of shades. The modified values are treated as a look-up table (LUT), which is used as the color tone conversion parameters. When using line/curve approximation, coefficients of the function may be used as the color tone conversion parameters. Similarly, when using gamma correction for the color tone conversion, the gamma value obtained with the corresponding values may be used as the color tone conversion parameters.

The color tone conversion parameter fixing unit 46 evaluates the color tone conversion parameters and judge them appropriate or not in Steps S170, S180.

If the color tone conversion parameters are not appropriate, the branch labeled "NO" at S180 is taken and the processing ends.

If the color tone conversion parameters are appropriate, the branch labeled "YES" at S180 is taken and the processing proceed to the next step.

At the S140, the appropriateness of the color tone conversion parameters may be judged, for example, by the distance from the parameters with which the input and output are the same when the color tone conversion is applied. Assuming the color tone conversion is represented in graph, the distance may be measured by one of the following values:

a) the accumulated sum of the absolute values of the difference between the input and the output
b) the accumulated sum of the squared values of the difference between the input and the output
c) the maximum value of the absolute values of the difference between the input and the output
d) the maximum value of the slope of the graph The color tone conversion parameters are judged as appropriate when the above values fall into a predetermined range.

Figure 18A:
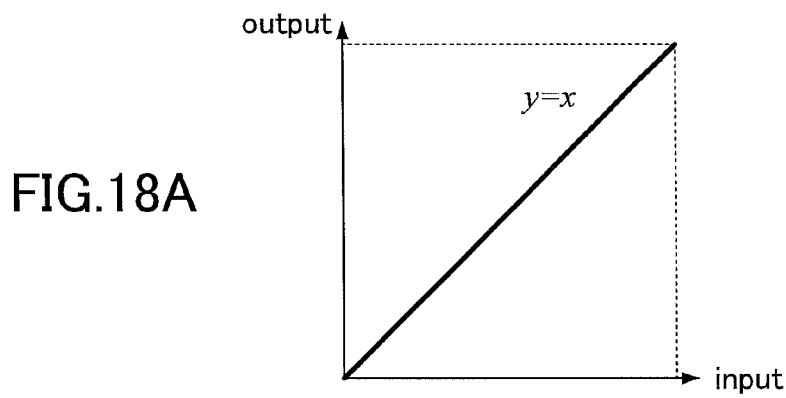
FIG. 18A, FIG. 18B, FIG. 18C, and FIG. 18D are schematic views illustrating examples of color tone conversion parameters for a case in which image data remains unchanged before and after a color tone conversion.
Figure 18B:
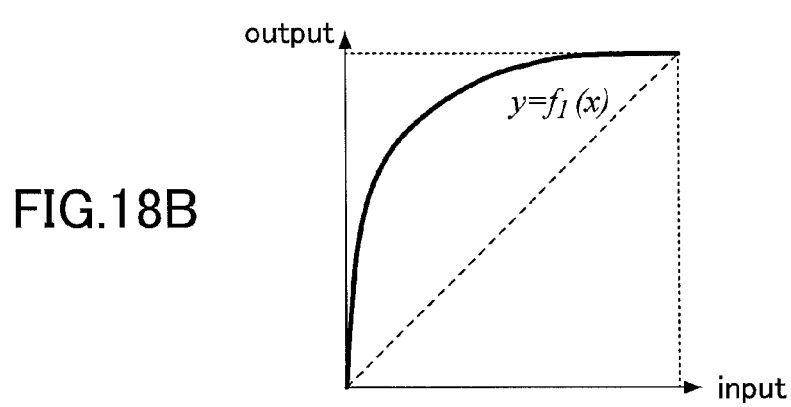
Figure 18C:
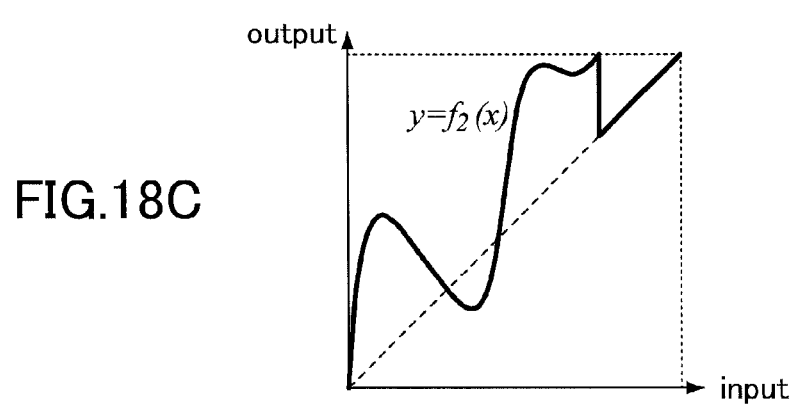

The reason why the appropriateness of the color tone conversion parameters is judged is to determine whether the execution of the color tone conversion is meaningless or not. In other words, it judges the convergence of the color tone conversion. Therefore, Step S180 may be skipped if appropriate. Execution of color tone conversion may be meaningless in the following cases:

a) Case where the Image Data Remains Unchanged Before and After Color Tone Conversion FIG. 18A illustrates an example of color tone conversion parameters with which the image data remains unchanged before and after the color tone conversion. The graph representation of the color tone conversion parameters in FIG. 18A is almost equivalent to the line of function y=x where the input and the output are the same. In case that gamma correction is used for the color tone conversion, the graph corresponds with the gamma value of 1.0. In this case, the execution of color tone conversion is meaningless.

b) Case where the Image Data Changes Extremely Before and After Color Tone Conversion FIGS. 18B and 18C show examples of color tone conversion parameters with which the image data changes extremely before and after color tone conversion.

In FIG. 18B, the graph representing the color tone conversion is far away from function y=x where the input and the output are the same. It is desirable to avoid such a color tone conversion because it changes the color tone of the user printed material significantly. In FIG. 18C, the graph of the color tone conversion waves wildly relative to the line of function of y=x, or has discontinuous points. It is desirable to avoid such a color tone conversion because it introduces discontinuous color tone 2E changes in the user printed material. In case that gamma correction is used for the color tone conversion, the former graph corresponds with the gamma value is close to zero, or extremely larger than one.

It is noted that although cases in which one output value corresponds to multiple input values, or cases with discontinuous points as shown in FIG. 18C are undesirable, these cases may be permissible depending on the degree.

Figure 18D:
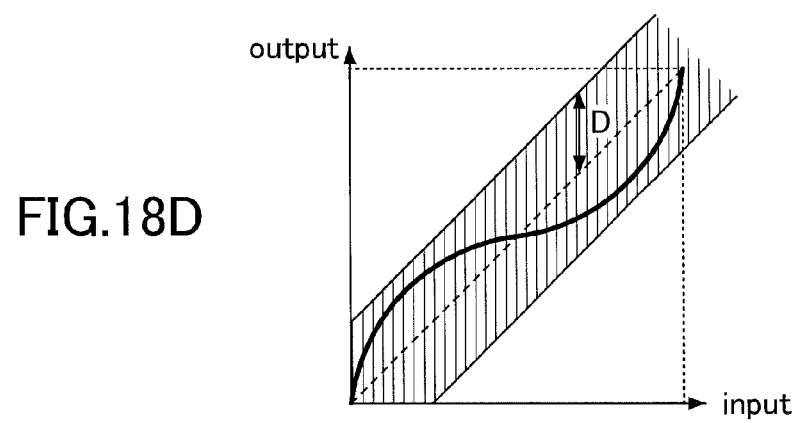

Also, as shown in FIG. 18D, it may be judged that the image data does not change extremely before and after the color tone conversion as the graph of the color tone conversion parameters are within a predetermined distance from the line of function of y=x. For each input value of the color tone conversion parameters, the output value is judged whether it is within plus or minus d % from the input value, or within a distance of D, where d or D denotes a predetermined value.

In case that the color tone conversion parameters are appropriate, the color tone conversion unit 47 applies color tone conversion to the original image data at Step S190. Using the color tone conversion parameters, the unit applies the color tone conversion to the original image data to update the original image data. A series of processing steps may be concluded at this stage of the processing. Examples of the color tone conversion include gamma correction mentioned earlier or conversion using a look-up table (LUT).

The color tone conversion is iterated a predetermined number of times. Therefore, when reaching the predetermined iteration count, which is the "YES" branch at Step S200, the processing of color tone conversions end. Although only one time of the color tone conversion may produce a sufficient color tone conversion result, multiple executions may improve the precision of color matching.

In case of repeating, the "NO" branch at Step S200, the color-matched original image data is taken as input and printed by the user printer 200 at Step S120, and the same processing is executed. It is noted that the original image data used in the next iteration of the loop has been applied with the color tone conversion.

Although there are three termination conditions in FIG. 17, it is not necessary to execute all of these. Some of these may be skipped, although it is desirable that at least one of these is executed.

In the present embodiment, the color space that is used for the scanner 300 is also used for later steps. As the color space is device dependent, it is desirable to convert the color space to a device independent color space using the color profile of the scanner 300. RGB or XYZ color space may be used as device independent color space. It would be much better to convert to a uniform color space such as L*a*b* color space.

In case that the processing is executed with the output image data converted into L*a*b* color space, the original image data also needs to be converted into L*a*b* color space. Also, the estimation of the color reproducing characteristics, the determination of the color tone conversion parameters, and the color tone conversion are executed in L*a*b* color space, although it is required to switch back to the original color space after the color tone conversion.

[Other Examples of Color Tone Conversion]
(1) TRC(Tone Reproduction Curve)

The tone reproduction curve is converted based on the halftone dot density corresponding to original colors.
Color a->halftone dot density A
Color b->halftone dot density B If there is a mapping between the color "a" and "b" in the color tone conversion parameters, the halftone dot density A will be converted into the halftone dot density B.
(2) Pixel-Wise Replacement Matrices or lists may be used as LUT, although these may not be needed in practice. A pixel value may be replaced with an original color that is the same output color at the nearest neighborhood.
(3) Reflection of the Difference into the Original Image Data by Applying the Conversion Matrix Another color tone conversion method may take the differences between the reference image data and the user image data, apply the color tone conversion parameters to the differences, and reflect the converted results in the original image data. The color tone conversion parameters for this method, for example, may use misaligned values between the graph showing the mapping of the color conversion and the line of function of y=x, with the horizontal axis representing the shades of the reference image and the vertical axis representing the shades of the user image data. The line of function of y=x represents a mapping where two sets of shades are equivalent. When applying the color tone conversion parameters to the above differences, a method using color tone conversion parameters as weight may be considered, in which the greater the weight becomes, the larger the amount of misalignment becomes.
(4) Use of ICC Profile Conversion parameters or a look-up table for converting a device dependent color space to Profile Connection Space (PCS) are determined using color tone conversion parameters in ICC profile. If the input profile is attached to the original image data, the input profile may be updated. If not, a new profile may be created and attached. The output profile may be updated instead of the input profile.

Although the above description assumes only one set of color tone conversion parameter is estimated for the original image data, the original image data may be partitioned into blocks, and the color tone conversion may be applied to each block with the color tone conversion parameters estimated for the block. Moreover, to avoid possible discontinuity of color tones at the boundary of blocks, the color tone conversion may be applied to pixels or local areas smaller than blocks using the color tone conversion parameters estimated for these small areas based on the color tone conversion parameters estimated for the blocks.

As explained above, in the present embodiment, the color tone conversion parameter generation system 600 can match color tones of the reference printer and the user printer without using color chart. When the color reproduction range of the reference or user printer is narrower than the color reproduction range of the original image data, the system does not convert colors in the non-reproducible range, or extrapolates the color tone reproduction characteristics of the reference or user printer, which has a narrower color reproduction range than the color reproduction range of the original image data. By this processing, the precision of color tone reproduction characteristics estimation is prevented from degradation caused by pixel values out of the color reproduction range.

Second Embodiment

The color tone conversion parameter generation system 600 in the first embodiment, which generates a mask for pixel values in the original image data out of the color range of the reference printer, has been explained. The color tone conversion parameter generation system 600 in the second embodiment, which corrects the range out of the color reproduction range in the color tone reproduction characteristics once estimated during the process of estimating the color tone reproduction characteristics, without generating a mask, will be explained. The functional block diagram will not be explained because it is similar to that of the first embodiment.

FIG. 19 is a flowchart illustrating a procedure in which the image input unit 41 captures a reference printed material and a user printed material, then, the color tone reproduction characteristics estimation unit 45 generates color tone reproduction characteristics data. Compared to FIG. 11, Step S103, "Generate a mask for pixels in the original image data out of the color range of the printer", is omitted. Instead, Step S108, "Correct the range out of the color range of the original image data, using the color tone reproduction characteristics", is newly added.

At Step S108, the color tone reproduction characteristics estimation unit 45 corrects the range out of the color range of the reference or user printer with the color tone reproduction characteristics. The target of correction is the color tone reproduction characteristics data generated at Step S101 and S105 in FIG. 11. Therefore, Step S108 is executed twice in most cases.

In this embodiment, since the original image data is not masked, the color tone reproduction characteristics data is obtained for the whole range of the original image data. However, this color tone reproduction characteristics data has problem as shown in FIG. 5A-B: Different colors in the original image data out of the printer's color range may correspond to a single color in the reference or user image data. Or the slope of the color tone reproduction characteristics data may be zero or a negative value.

Therefore, the color tone reproduction characteristics estimation unit 45 corrects the color tone reproduction characteristics data with the following methods:
a) The color tone reproduction characteristics estimation unit 45 synthesizes new color tone reproduction characteristics data by weighting existing color tone reproduction characteristics data and using a predetermined function.
b) The color tone reproduction characteristics estimation unit 45 extrapolates the range below $u_{low}$ and above $u_{high}$ of the original image data.

Figure 20A:
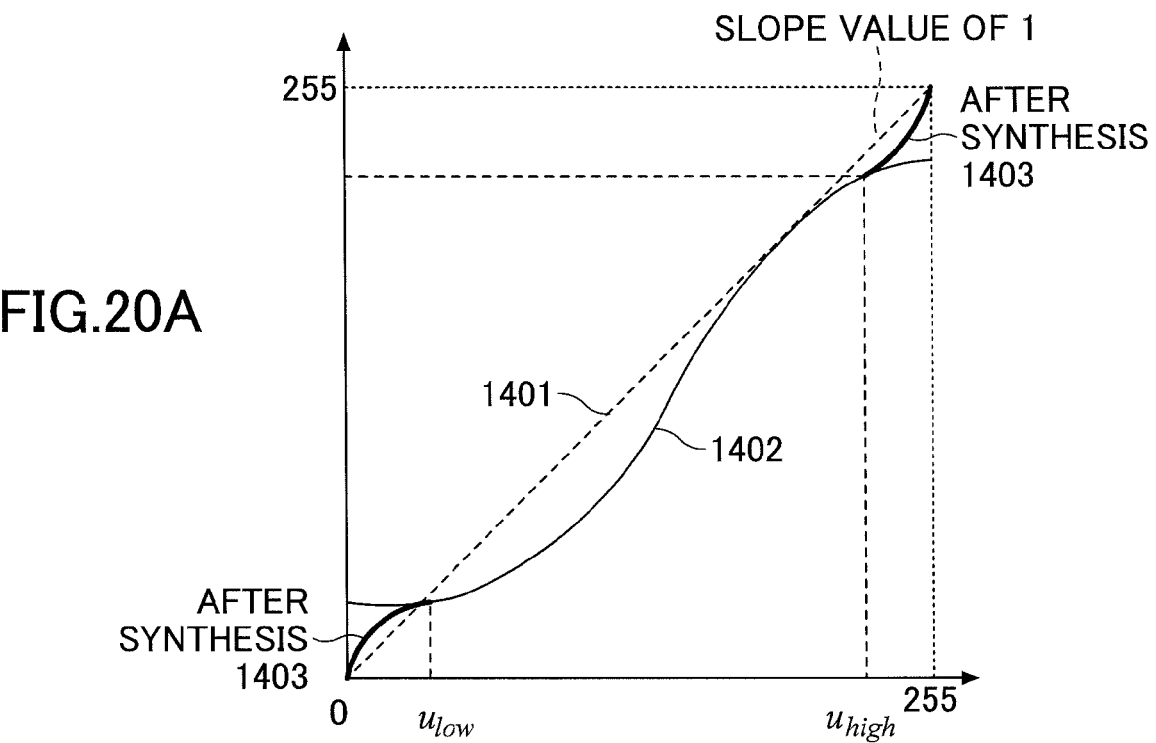
FIG. 20A and FIG. 20B are schematic views illustrating weighting of color tone reproduction characteristics data.

FIG. 20A is a schematic view illustrating weighting of color tone reproduction characteristics data.

Line 1401 corresponds to a predetermined function mentioned above. In this case, the line represents function y=x with the slope value of one. The color tone reproduction characteristics estimation unit 45 synthesizes new color tone reproduction characteristics data, for example, from the line 1401 and the previous color tone reproduction characteristics data 1402 for each pixel in the range of 0 to 255, using a weight α, where 0≤α≤1. Synthesized color tone reproduction characteristics data=(pixel value of line 1401)*(1−α)+(pixel value of the previous color tone reproduction characteristics data)*α.

For the range between $u_{low}$ and $u_{high}$ of the original image data, the previous color tone reproduction characteristics data 1402 may be used as is, a large weight is given. For the range below $u_{low}$ and above $u_{high}$ of the original image data, the previous color tone reproduction characteristics data 1402 is not reliable, a small weight is given. Therefore, it is desirable that the weight is represented by a function taking small values around 0 or 255, large values around 128.

Figure 20B:
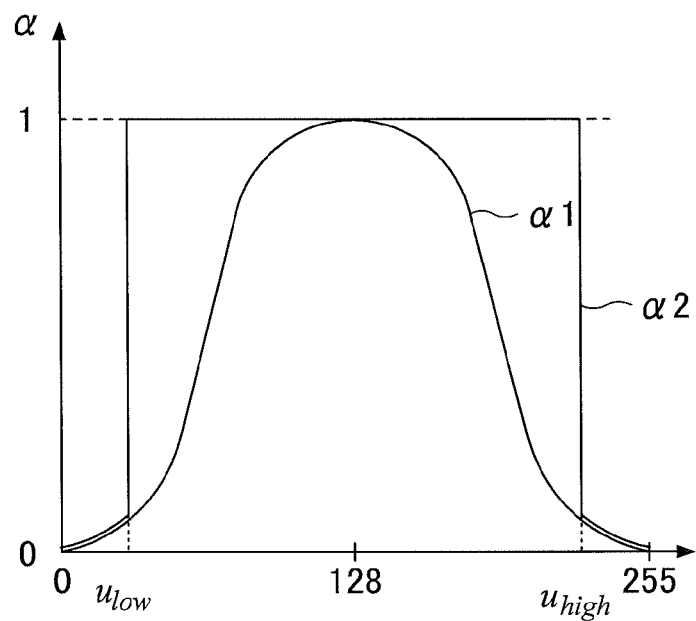

FIG. 20B is a schematic view illustrating the relationship between the weight and pixel values. The graph of a weight function, α1 takes values of almost 0 around the pixel value of 0, forms a steep slope towards to the pixel value of 128, takes the peak value around 128, then becomes smaller rapidly, and finally takes values of almost 0 around 255. For the range between $u_{low}$ and $u_{high}$ of the original image data, or α≥1−α. For the range below $u_{low}$ and above $u_{high}$ of the original image data, α<1−α or α<0.5.

Using such α1, the synthesized color tone reproduction characteristics data has a relatively large ratio of the previous color tone reproduction characteristics data 1402 to the line 1401 for the range between $u_{low}$ and $u_{high}$ of the original image data, and has a relatively large ratio of the line 1401 to the previous color tone reproduction characteristics data 1402 for the range below $u_{low}$ and above $u_{high}$ of the original image data. Therefore, the synthesized color tone reproduction characteristics data 1403 gradually converges to the origin (0, 0) under $u_{low}$, and converges to (255, 255) above $u_{high}$. It is noted that a part of the graph, between $u_{low}$ and $u_{high}$ of the original image data, of the synthesized color tone reproduction characteristics data 1403 is omitted in FIG. 20A.

Weight function a is not limited to α1. α2 in FIG. 20B or the like are also permissible. α2 is similar to α1 around the pixel value of 0 or 255, but takes the value 1 for the range between $u_{low}$ and $u_{high}$. A weight function like α2 makes the synthesized color tone reproduction characteristics data gradually converge to the origin (0, 0) under $u_{low}$, and converge to (255, 255) above $u_{high}$, and be the same as the previous color tone reproduction characteristics data 1402 for the range between $u_{low}$ and $u_{high}$.

Also, predetermined function is not limited to the line 1401, or function y=x, it could be any function passing the origin (0, 0) and (255, 225).

Figure 21A:
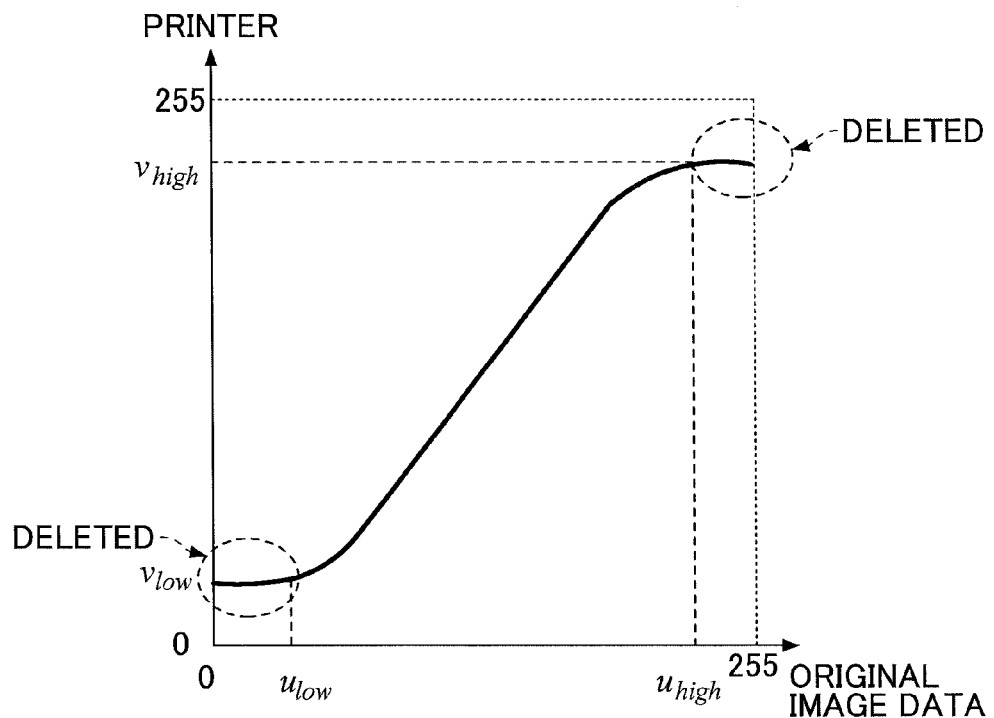
FIG. 21A and FIG. 21B are schematic views 2E illustrating correction of color tone reproduction characteristics data.
Figure 21B:
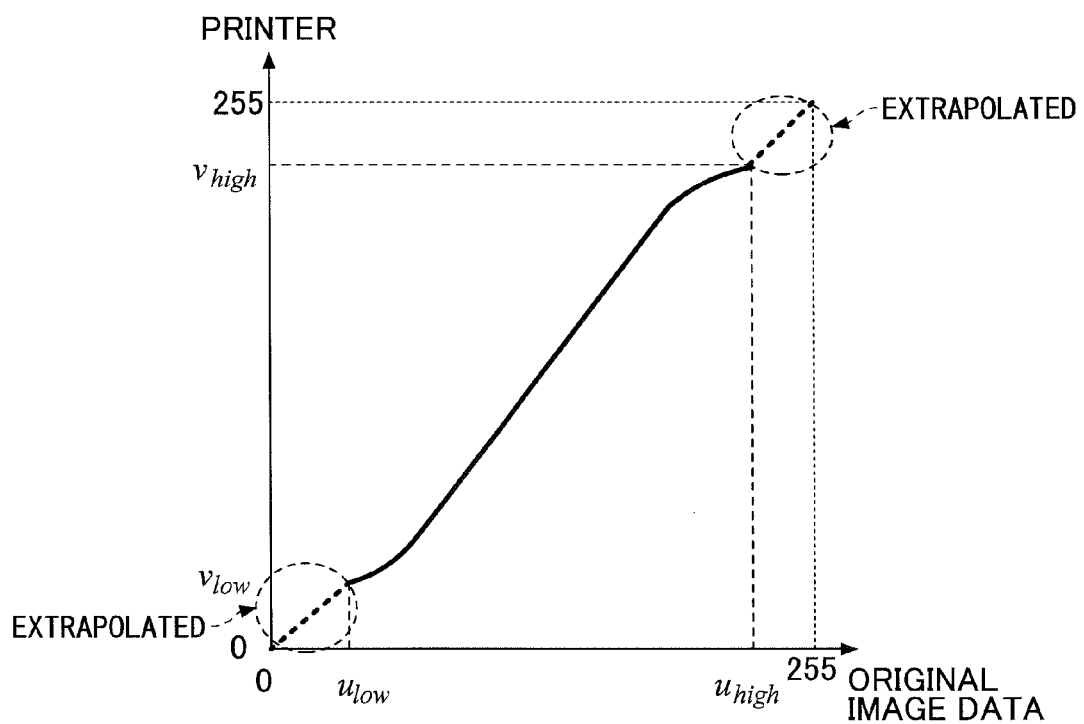

FIGS. 21A-B are schematic views illustrating the correction method of b). The correction method of b) may adopt a method similar to the extrapolation in the first embodiment that corrects end parts of the color tone reproduction characteristics. In this embodiment, however, the end points of the color tone reproduction characteristics has data elements within the color range of the reference or user printer as shown in FIG. 21A, because pixels in the original image data that is out of the color range of the reference or user printer are not masked.

For this reason, the color tone reproduction characteristics estimation unit 45 deletes the color tone reproduction characteristics data out of the color range of the reference or user image data as shown in FIG. 21B, based on the color reproduction range information of the reference or user printer that is stored beforehand.

Then, the color tone reproduction characteristics estimation unit 45 corrects the end parts of the color tone reproduction characteristics similarly to the first embodiment.

According to the present embodiment, similarly to the first embodiment, the problem of unstable color tone conversion parameters out of the color reproduction range of the printers can be avoided. The other problem of possible degradation of the precision of color tone reproduction characteristics also can be avoided. These problems might arise when estimating the color tone conversion parameters using the color tone reproduction characteristics before correction. In the present embodiment, since mask image data is not needed, resources such as memory are required less. In case of adopting the correction method a), more continuous color tone reproduction characteristics data throughout the whole range of the original image data may be obtained compared to the extrapolation in the first embodiment.

Third Embodiment

In this embodiment, the color tone conversion parameter generation system 600 will be explained. The system 600 estimates the color tone conversion parameters. Then, the system 600 corrects the color tone conversion parameters depending on the color reproduction range of the reference or user printer. The functional block diagram will not be explained because it is similar to that of the first embodiment.

Figure 22:
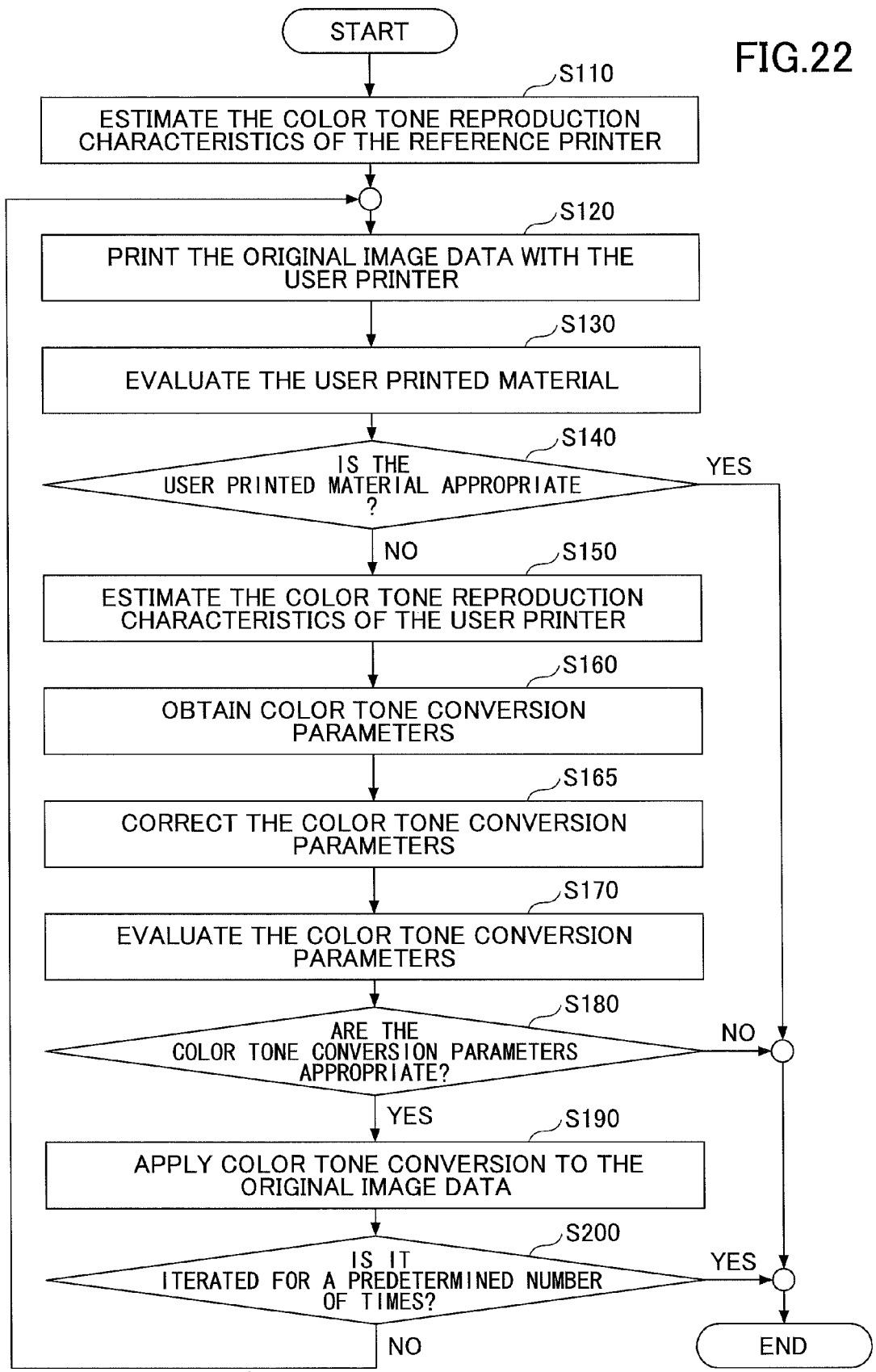
FIG. 22 is a flowchart illustrating the steps executed by a color tone conversion parameter generating system, or by an MFP, to generate color tone conversion parameters according to a third embodiment.

FIG. 22 is a flowchart illustrating the steps executed by the color tone conversion parameter generating system 600, or by MFP 700, to generate color tone conversion parameters. FIG. 22 differs from FIG. 17 in that FIG. 22 has an additional step of S165, "Correct the color tone conversion parameters."

The color tone conversion parameter fixing unit 46 corrects ranges out of the color reproduction range of the reference or user printer in the color tone conversion parameter estimated at Step S160. This method is different from the correction method in the second embodiment in that instead of correcting the color tone reproduction characteristics of the reference or user printer, the color tone conversion parameters estimated by the color tone reproduction characteristics are corrected here.

Figure 23:
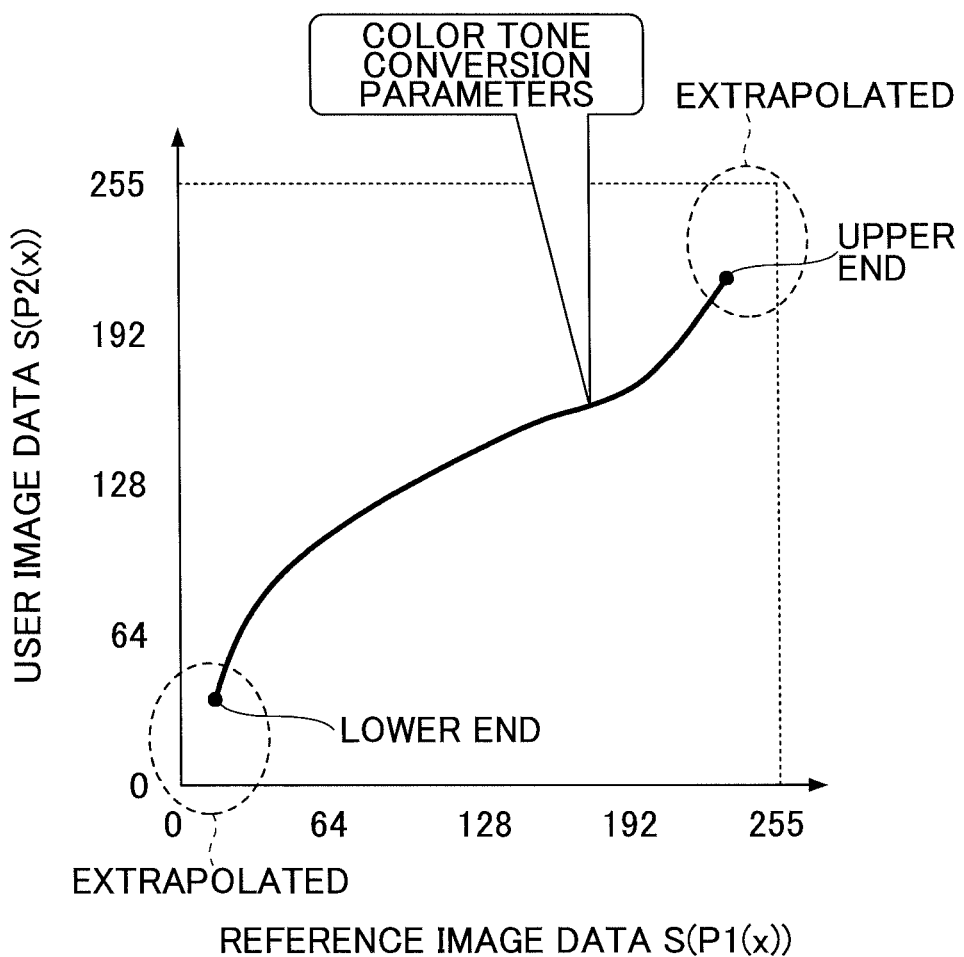
FIG. 23 is a schematic view illustrating color tone conversion parameters.

FIG. 23 is a schematic view illustrating color tone conversion parameters. As explained earlier, the reference image data, more precisely, $S(P_1(x))$, or the reference image data captured by scanner, has restrictions on the color reproduction range. The user image data, $S(P_2(x))$, or the user image data captured by scanner has restrictions on the color reproduction range. Therefore, there are ranges where the correspondence between $S(P_2(x))$ and $S(P_2(x))$ is not defined, such as ranges below the lower end and above the upper end of the graph shown in FIG. 23.

The correction method of color tone conversion parameters in this embodiment uses the extrapolation adopted in the first and second embodiments that extrapolates the lower end and the upper end of the color tone conversion parameters with line or function.

In this embodiment, the estimated precision of color tone reproduction characteristics for the range out of the color reproduction range of the printer might be degraded when estimating the color tone reproduction characteristics. For example, different colors, e.g., "a" and "b", might be mapped to the same $S(P_1(x))$ or $S(P_2(x))$. In this case, the reliability of the pair of "a" and "b" is degraded.

A degraded precision of the color tone reproduction characteristics may affect the reliability of the color tone conversion parameters. The reliability can be improved correcting the range out of the color reproduction range of the printer in the color tone conversion parameters which has been obtained.

It is noted that the range where $S(P_1(x))$ and $S(P_2(x))$ do not have correspondences depends on the width of pixel values in the original image data. Therefore, the color tone conversion parameter fixing unit 46 identifies the upper end and the lower end of the color tone conversion parameters. The upper end is the largest $S(P_2(x))$ in the user image data that corresponds to $S(P_1(x))$ in the reference image data. The lower end is the smallest $S(P_2(x))$ in the user image data that corresponds to $S(P_1(x))$ in the reference image data.

In case that the width of pixel values in the original image data is sufficiently wide, the obtainable range of the color tone conversion parameters may be close to the color reproduction range of the reference or user printer, whichever the narrower. Therefore, the upper end and the lower end of the color tone conversion parameters may be identified with the color reproduction range information stored beforehand as done in the first or second embodiment.

In case that either one of the color reproduction range of the reference printer and the color reproduction range of the user printer is not included in the other, the overlapped sub-range of two color reproduction ranges can be used. The outside of the overlapped sub-range will be corrected.

After identifying the upper and lower ends as explained above, ranges out of the upper and lower ends can be extrapolated as done in the first or second embodiment.

The present embodiment produces the same effects as the second embodiment with a fewer passes of the correction processing, which is done twice in the second embodiment whereas once in this embodiment. One pass of the correction processing is applied to each of RBG.

Fourth Embodiment

The previous embodiments assume the color tone conversion parameter generation system 600 stores the color reproduction information of the reference or user printer beforehand. In this embodiment, it is assumed that the color reproduction information of the reference or user printer is not given. Under this condition, the color tone conversion parameter generation system 600 will be explained as follows. It is noted that the color reproduction information estimated with the processing of this embodiment may be used in the previous embodiments.

Figure 24:
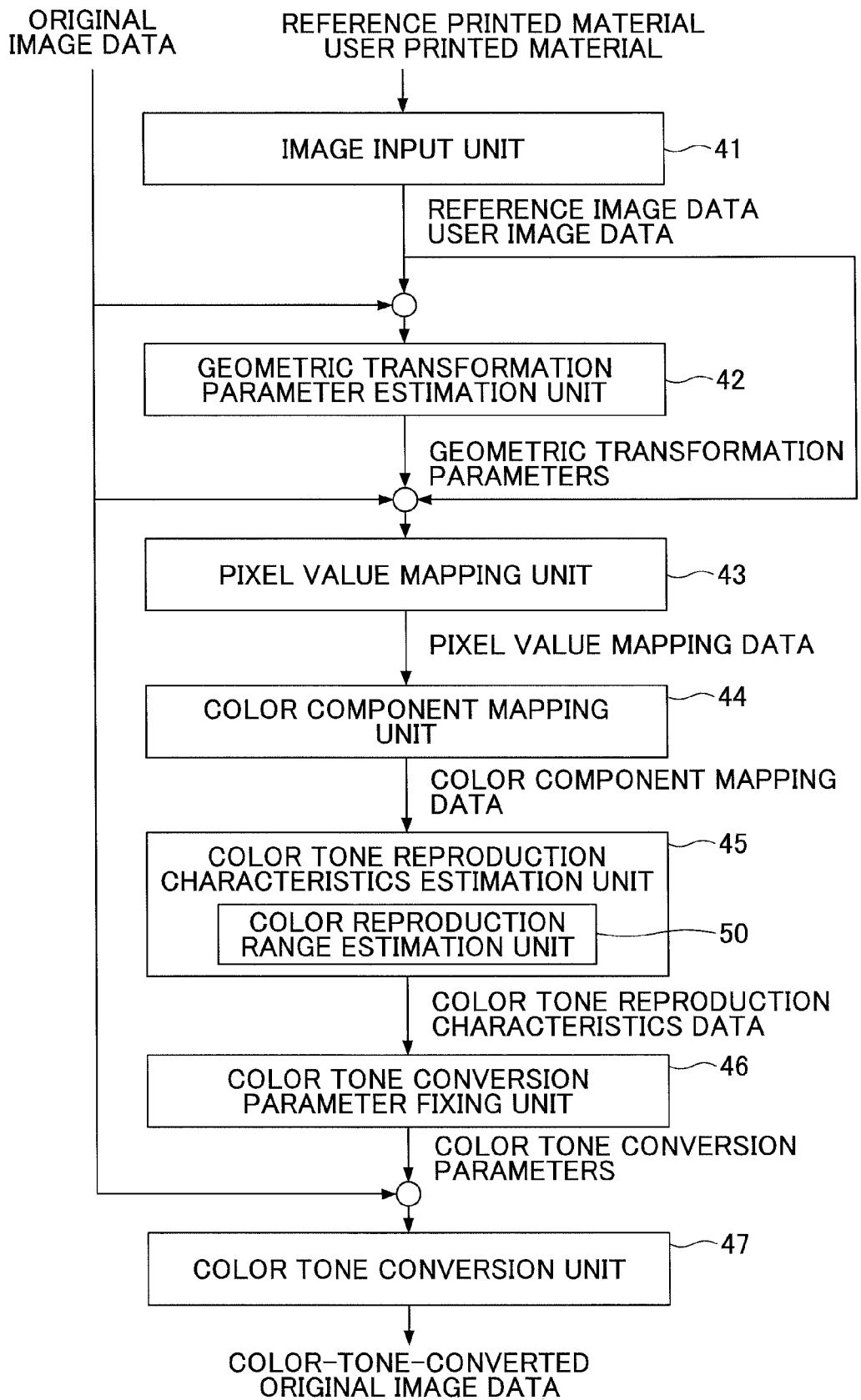
FIG. 24 is a functional block diagram of a color tone conversion parameter generating system, or an MFP according to a fourth embodiment.

FIG. 24 is a functional block diagram of the color tone conversion parameter generating system 600, or MFP 700. Compared to FIG. 10, FIG. 24 includes the color reproduction range estimation unit 50. The color reproduction range estimation unit 50 estimates the color reproduction range of the reference or user printer from the color tone reproduction characteristics data.

Figure 25:
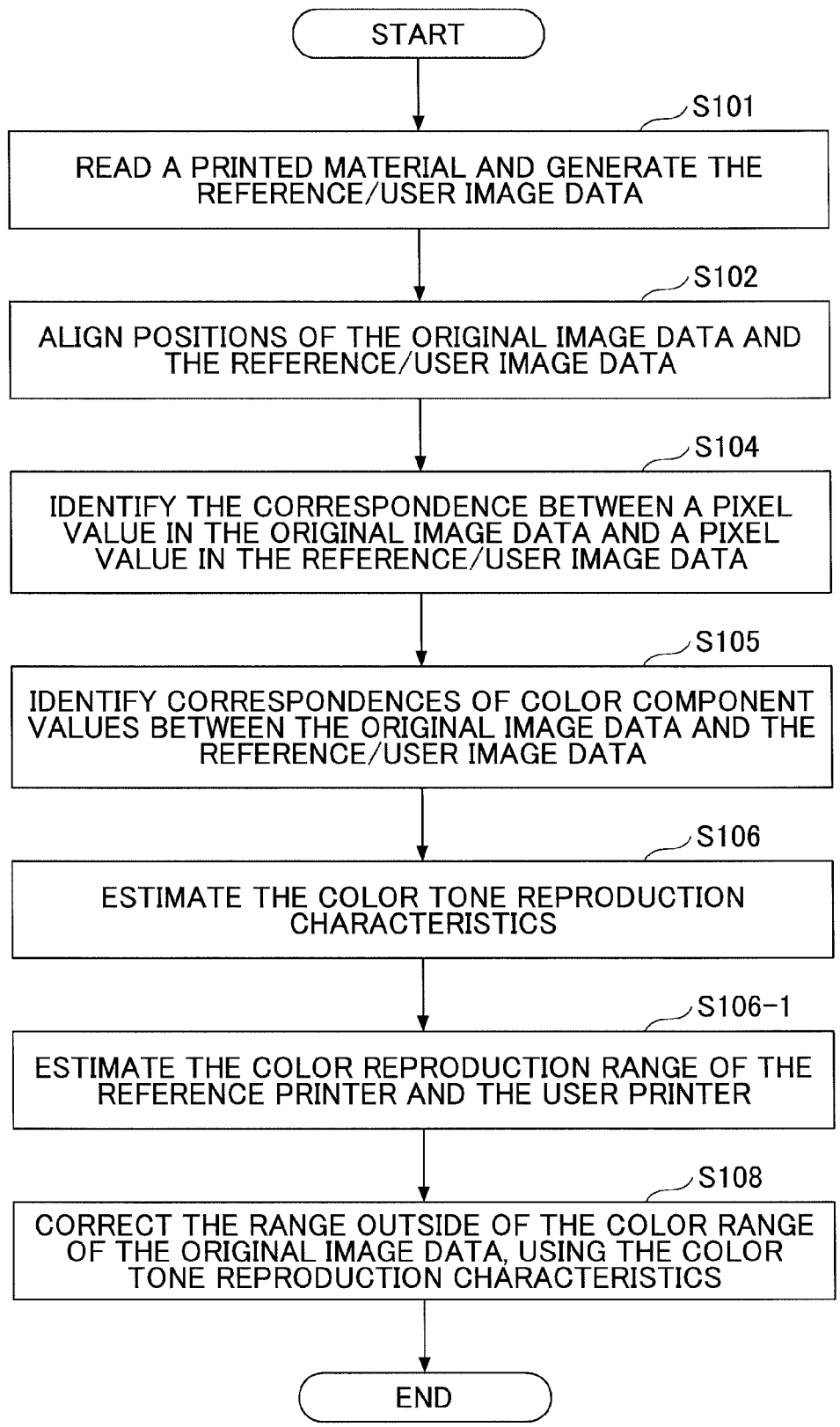
FIG. 25 is a flowchart illustrating a procedure in which an image input unit captures a reference printed material and a user printed material, then, a color tone reproduction characteristics estimation unit generates color tone reproduction characteristics data, according to the fourth embodiment.

FIG. 25 is a flowchart illustrating a procedure in which the image input unit 41 captures a reference printed material and a user printed material, then, the color tone reproduction characteristics estimation unit 45 generates color tone reproduction characteristics data. Compared to FIG. 11, FIG. 24 includes a new step, S106-1: "Estimate the color reproduction range of the reference printer and the user printer."

At Step S106-1, the color reproduction 1E range estimation unit 50 estimates the color reproduction range of the reference printer and the user printer as follows. Estimation methods may include:

a) Method Using the Slope of Color Tone Reproduction Characteristics Data

The color reproduction range of the reference printer and the user printer is estimated using the color tone reproduction characteristics data estimated at Step S106. The color reproduction range estimation 2E unit 50 identifies ranges out of the color reproduction range according the slope value of end parts in the color tone reproduction characteristics data shown in FIG. 5A-B. In ranges out of the color reproduction range, the slope value of the color tone reproduction characteristics curve is zero or a negative value. Therefore, for example, when estimating the color tone reproduction characteristics in an RGB color space with 256 shades, the boundaries of the color reproduction range is judged by identifying points at which the slope value of the color tone reproduction characteristics data is less than a threshold value, or greater than or equal to a threshold value.

b) Method Using Dispersion of Color Component Values

At Step S104 the correspondence between a pixel value in the original image data and a pixel value in the reference or user image data is identified. Then, the dispersion of pixel values in the reference or user image data corresponding to a certain value in the original image data is obtained. The boundaries of the color reproduction range are judged by identifying points at which the dispersion satisfies certain conditions. For example, a point whose dispersion is less than a predetermined threshold value, or greater than or equal to a threshold value, may be judged as on the boundaries.

It is noted that in case of estimating the color reproduction range of the printer using dispersion of color component values, Step S106-1 may be used if Step S104 has been completed.

c) Method Using the Slope of Color Tone Conversion Parameters

As explained in the third embodiment, there are ranges where the correspondence between $S(P_1(x))$ and $S(P_2(x))$ is not defined. Therefore, by identifying the lower end and the upper end of the color tone conversion parameters, a narrower range of the color reproduction range of the reference printer and the color reproduction range of the user printer is obtained. Instead of using the lower end and the upper end of the color tone conversion parameters, slope values within the obtainable range of the color tone conversion parameters may be used. The boundaries of the color reproduction range is judged by identifying points at which the slope value of the color tone reproduction characteristics data is less than a threshold value, or greater than or equal to a threshold value. With the latter method, the color reproduction range is determined more accurately.

Figure 26:
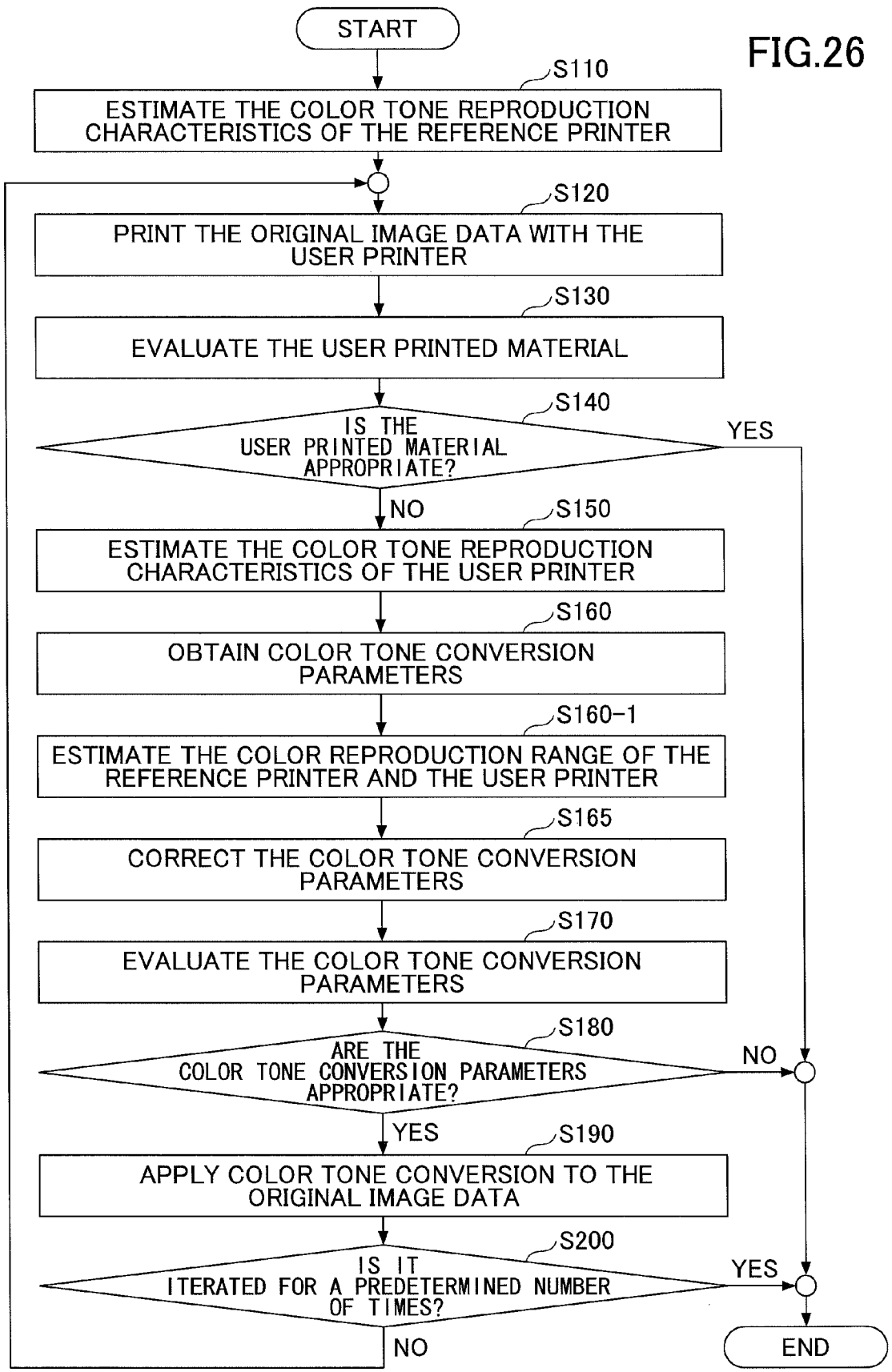
FIG. 26 is a flowchart illustrating the steps executed by a color tone conversion parameter generating system, or by an MFP, to generate color tone conversion parameters according to the fourth embodiment.

FIG. 26 is a flowchart illustrating the steps executed by the color tone conversion parameter generating system 600, or by MFP 700, to generate color tone conversion parameters. Compared to FIG. 22, FIG. 26 has an additional step, S160-1: "Estimate the color reproduction range of the reference printer and the user printer."

After estimating the color reproduction range of the reference or user printer, the color tone conversion parameter may be corrected as done in the third embodiment. It is noted that in case of c), the color reproduction range estimation unit 50 is included in the color tone conversion parameter fixing unit 46, instead of the color reproduction estimation unit.

Once obtained the color reproduction range information, it is usable in the color tone conversion parameter generation system 600 in the first embodiment. As for the first embodiment, the color reproduction range information needs to be generated once using one of the methods of a)-c).

The color tone conversion parameter generation system 600 in the present embodiment can generate color tone conversion parameter even if the color reproduction range information is not given.

Further, the present invention is not limited to these embodiments, but various variations and modifications may be made without departing from the scope of the present invention.

The present application is based on Japanese priority application No. 2011-256350 filed on Nov. 24, 2011, with the Japanese Patent Office, the entire contents of which are hereby incorporated by reference.

What is claimed is:

1. An image processing apparatus for causing a first image output device to output first output data from original image data and a second image output device to output second output data from the original image data, the image processing apparatus comprising:
  a color component mapping device configured to generate first color component mapping data containing correspondences between pixel values in first output image data obtained by capturing the first output data with an input device and pixel values in the original image data, and second color component mapping data containing correspondences between pixel values in second output image data obtained by capturing the second output data with the input device and pixel values in the original image data;
  a color tone conversion parameter fixing device configured to utilize the first color component mapping data and the second color component mapping data to generate color tone conversion parameters from pairs of a pixel value in the first output image data and a pixel value in the original image data, the pixel value in the original image data when output as the second output image data having a pixel value equal to the pixel value in the first output image data;
  a color tone conversion device converting pixel values in the original image data in response to the color tone conversion parameter; and
  a reproducible color storing device storing the colors in the original image data that are reproducible by the first or the second image output device, wherein
  the color component mapping device corrects the first color component mapping data that includes correspondences with colors that are not reproducible by the first image output device,
  corrects the second color component mapping data that includes correspondences with colors that are not reproducible by the second image output device,
  wherein the color tone conversion parameter fixing device generates the color tone conversion parameters from the pairs of pixel values reproducible by the first and the second image output device from the original image data, and
  wherein the color component mapping device assigns a weight a to the first color component mapping data, assigns a weight $\beta$ to a function that specifies correspondence between a pixel value and another pixel value, synthesizes the color component mapping data with the function,
  and when correcting the first color component mapping data, sets the weight as $\alpha \geq \beta$ for ranges where colors in the original image data are reproducible by the first image output device, sets the weight as $\alpha < \beta$ for ranges where colors in the original image data are not reproducible by the first image output device,
  assigns another value of weight $\alpha$ to the second color component mapping data, assigns another value of weight $\beta$ to the function, synthesizes the color component mapping data with the function,
  and when correcting the second color component mapping data, sets the weight as $\alpha \geq \beta$ for ranges where colors in the original image data are reproducible by the second image output device, sets the weights as $\alpha < \beta$ for ranges where colors in the original image data are not reproducible by the second image output device.

2. The image processing apparatus according to claim 1, further comprising a reproducible color storing device storing the colors in the original image data that are reproducible by the first or the second image output device,
  wherein the color component mapping device generates the first color component mapping data by selecting only the colors reproducible by the first image output device and identifies correspondences with the first output image data,
  generates the second color component mapping data by selecting only the colors reproducible by the second image output device and identifies correspondences with the second output image data.

3. The image processing apparatus according to claim 1, wherein the color tone conversion parameter fixing device interpolates ranges of pixel values in the original image data that are not covered by the color tone conversion parameters, the interpolation being performed based on ranges of pixel values in the original image data that are covered by the color tone conversion parameters.

4. The image processing apparatus according to claim 2, wherein the color component mapping device extrapolates the first color component mapping data to cover not only the selected colors reproducible by the first image output device, but also the colors that are not reproducible by the first image output device, and
  extrapolates the second color component mapping data to cover not only the selected colors reproducible by the second image output device, but also the colors that are not reproducible by the second image output device.

5. The image processing apparatus according to claim 1, wherein the color component mapping device assigns a ratio, $\beta/\alpha$, which is set to near zero for ranges where colors in the original image data are reproducible by the first or the second image output device, and the color component mapping device assigns a ratio, $\alpha/\beta$, which is set to near zero for ranges where colors in the original image data are not reproducible by the first or the second image output device.

6. The image processing apparatus according to claim 1, wherein the color component mapping device extracts the first color component mapping data that corresponds to the colors in the original image data that are reproducible by the first image output device, corrects the first color component mapping data by extrapolating the colors in the original image data that are not reproducible by the first image output device, and
  extracts the second color component mapping data that corresponds to the colors in the original image data that are reproducible by the second image output device, corrects the second color component mapping data by extrapolating the colors in the original image data that are not reproducible by the second image output device.

7. The apparatus according to claim 3, wherein the color tone conversion parameter fixing device interpolates ranges of pixel values in the original image data that are not covered by the color tone conversion parameters, the interpolation being done with lines so that the color tone conversion parameters cover all colors in the original image data.

8. The image processing apparatus according to claim 1, further comprising a reproduction range estimation device that estimates reproducible colors by the first image output device based on the first color component mapping data, and estimates reproducible colors by the second image output device based on the second color component mapping data.

9. The image processing apparatus according to claim 1, further comprising a reproduction range estimation device that estimates reproducible colors by the first and the second image output device based on at least either of endpoints or a form of the color tone conversion parameters.

10. An image processing system comprising:
a first image output device outputting first output data from original image data;
a second image output device outputting second output data from the original image data; and
an information processing device configured to generate color tone conversion parameters,
wherein the image processing system includes:
a color component mapping device configured to generate first color component mapping data containing correspondences between pixel values in first output image data obtained by capturing the first output data with an input device and pixel values in the original image data, and second color component mapping data containing correspondences between pixel values in second output image data obtained by capturing the second output data with the input device and pixel values in the original image data;
a color tone conversion parameter fixing device configured to utilize the first color component mapping data and the second color component mapping data to generate color tone conversion parameters from pairs of a pixel value in the first output image data and a pixel value in the original image data, the pixel value in the original image data when output as the second output image data having a pixel value equal to the pixel value in the first output image data;
a color tone conversion device converting pixel values in the original image data in response to the color tone conversion parameters; and
a reproducible color storing device storing the colors in the original image data that are reproducible by the first or the second image output device, wherein
the color component mapping device corrects the first color component mapping data that includes correspondences with colors that are not reproducible by the first image output device,
corrects the second color component mapping data that includes correspondences with colors that are not reproducible by the second image output device,
wherein the color tone conversion parameter fixing device generates the color tone conversion parameters from the pairs of pixel values reproducible by the first and the second image output device from the original image data, and
wherein the color component mapping device assigns a weight $\alpha$ to the first color component mapping data, assigns a weight $\beta$ to a function that specifies correspondence between a pixel value and another pixel value, synthesizes the color component mapping data with the function,
and when correcting the first color component mapping data, sets the weight as $\alpha \geq \beta$ for ranges where colors in the original image data are reproducible by the first image output device, sets the weight as $\alpha < \beta$ for ranges where colors in the original image data are not reproducible by the first image output device,
assigns another value of weight a to the second color component mapping data, assigns another value of weight $\beta$ to the function, synthesizes the color component mapping data with the function,
and when correcting the second color component mapping data sets the weight as $\alpha \geq \beta$ for ranges where colors in the original image data are reproducible by the second image output device, sets the weights as $\alpha < \beta$ for ranges where colors in the original image data are not reproducible by the second image output device.

11. The image processing system according to claim 10, further comprising a reproducible color storing device storing the colors in the original image data that are reproducible by the first or the second image output device,
wherein the color component mapping device generates the first color component mapping data by selecting only the colors reproducible by the first image output device and identifies correspondences with the first output image data,
generates the second color component mapping data by selecting only the colors reproducible by the second image output device and identifies correspondences with the second output image data.

12. An image processing method in an image processing system having a first image output device outputting first output data from original image data,
a second image output device outputting second output data from the original image data,
the method comprising the steps of:
generating first color component mapping data containing correspondences between pixel values in first output image data obtained by capturing the first output data with an input device and pixel values in the original image data, and second color component mapping data containing correspondences between pixel values in second output image data obtained by capturing the second output data with the input device and pixel values in the original image data;
fixing color tone conversion parameters by utilizing the first color component mapping data and the second color component mapping data to generate color tone conversion parameters from pairs of a pixel value in the first output image data and a pixel value in the original image data, the pixel in the original image data when output as the second output image data having a pixel value equal to the pixel value in the first output image data;
converting pixel values in the original image data in response to the color tone conversion parameters; and
storing the colors in the original image data that are reproducible by the first or the second image output device, correcting the first color component mapping data that includes correspondences with colors that are not reproducible by the first image output device, and correcting the second color component mapping data that includes correspondences with colors that are not reproducible by the second image output device,
wherein the color tone conversion parameters are generated from the pairs of pixel values reproducible by the first and the second image output device from the original image data, and assigning a weight $\alpha$ to the first color component mapping data, assigning a weight $\beta$ to a function that specifies correspondence between a pixel value and another pixel value, synthesizing the color component mapping data with the function, and when correcting the first color component mapping data, setting the weight as $\alpha \geq \beta$ for ranges where colors in the original image data are reproducible by the first image output device, setting the weight as $\alpha < \beta$ for ranges where colors in the original image data are not reproducible by the first image output device, assigning another value of weight a to the second color component mapping data, assigning another value of weight $\beta$ to the function, synthesizing the color component mapping data with the function, and when correcting the second color component mapping data, setting the weight as $\alpha \geq \beta$ for ranges where colors in the original image data are reproducible by the second image output device, setting the weights as $\alpha < \beta$ for ranges where colors in the original image data are not reproducible by the second image output device.

* * * * *